United States Patent
Farrahi Moghaddam et al.

(10) Patent No.: US 12,069,191 B2
(45) Date of Patent: Aug. 20, 2024

(54) VERIFICATION AND/OR CERTIFICATION ALONG A SERVICE CHAIN

(71) Applicant: Telefonaktiebolaget LM Ericsson (publ), Stockholm (SE)

(72) Inventors: Fereydoun Farrahi Moghaddam, Brossard (CA); Daniel Migault, Montreal (CA); Stere Preda, Longueuil (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 238 days.

(21) Appl. No.: 17/638,973

(22) PCT Filed: Sep. 13, 2019

(86) PCT No.: PCT/IB2019/057740
§ 371 (c)(1),
(2) Date: Feb. 28, 2022

(87) PCT Pub. No.: WO2021/048599
PCT Pub. Date: Mar. 18, 2021

(65) Prior Publication Data
US 2022/0329445 A1    Oct. 13, 2022

(51) Int. Cl.
*H04L 9/00* (2022.01)
*H04L 9/30* (2006.01)
*H04L 9/32* (2006.01)

(52) U.S. Cl.
CPC .................. *H04L 9/50* (2022.05); *H04L 9/30* (2013.01); *H04L 9/3247* (2013.01)

(58) Field of Classification Search
CPC ............ H04L 9/50; H04L 9/30; H04L 9/3247
See application file for complete search history.

(56) References Cited

U.S. PATENT DOCUMENTS

2016/0277188 A1    9/2016    Quinn et al.
2016/0315850 A1    10/2016    Dara et al.
(Continued)

OTHER PUBLICATIONS

Frank Brockners et al., Proof of Transit: Securely Verifying a Path or Service Chain; https://www.slideshare.net/frankbrockners/proof-of-transit-securely-verifying-a-path-or-service-chain; Oct. 4, 2015, consisting of 54 pages.
(Continued)

*Primary Examiner* — Normin Abedin
(74) *Attorney, Agent, or Firm* — Weisberg I.P. Law, P.A.

(57) ABSTRACT

A system, node and wireless device are provided. An intermediate node is provided that includes processing circuitry configured to: receive a packet where the packet includes metadata associated with first input data of a first node, first output data of the first node, a first PC signature and a public cryptographic key associated with the first node, verify that the first PC signature corresponds to a process that led from the first input data to the first output data using the public cryptographic key, verify a link between first node and the intermediate node by comparing the received packet and the first output data, and determine whether to perform at least one service function on the packet based at least in part on the verification of the first PC signature and the verification of the link between the first node and the intermediate node.

28 Claims, 10 Drawing Sheets

(56) References Cited

U.S. PATENT DOCUMENTS

2018/0294969 A1\* 10/2018 Holness ............... H04L 9/3247
2018/0367621 A1\* 12/2018 Mullender ............. H04L 67/02

OTHER PUBLICATIONS

Frank Brockners, Verify My Service Chain; https://blogs.cisco.com/getyourbuildon/verify-my-service-chain; Jun. 3, 2015, consisting of 9 pages.

Lu et al., Sequential Aggregate Signatures and Multisignatures Without Random Oracles; Annual International Conference on the Theory and Applications of Cryptographic Techniques, May 28, 2006; Springer, Berlin, Heidelberg, consisting of 21 pages.

Amitabh Saxena et al., One-Way Signature Chaining—A New Paradigm for Group Cryptosystems; International Journal of Information and Computer Security; Dept. of Computer Science and Computer Engineering La Trobe University; Jan. 1, 2008, consisting of 21 pages.

Matthias Wahlisch et al., Towards Detecting BGP Route Hijacking Using the RPKI; Proceedings of the ACM SIGCOMM 2012 Conference on Applications, Technologies, Architectures, and Protocols for Computer Communication; Aug. 13, 2012, consisting of 2 pages.

International Search Report and Written Opinion dated May 4, 2020 issued in PCT Application No. PCT/IB2019/057740, consisting of 13 pages.

\* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Metadata Class     |       Type      |U|       Length      |
+-+-+-+-+-+-+-+-+-+-+-+-+-+-+-+-+-+-+-+-+-+-+-+-+-+-+-+-+-+-+-+-+
|                    Variable-Length Metadata                   |
+-+-+-+-+-+-+-+-+-+-+-+-+-+-+-+-+-+-+-+-+-+-+-+-+-+-+-+-+-+-+-+-+
```

FIG. 10

VERIFICATION AND/OR CERTIFICATION ALONG A SERVICE CHAIN

CROSS-REFERENCE TO RELATED APPLICATION

This application is a Submission Under 35 U.S.C. § 371 for U.S. National Stage Patent Application of International Application Number: PCT/IB2019/057740, filed Sep. 13, 2019 entitled "VERIFICATION AND/OR CERTIFICATION ALONG A SERVICE CHAIN," the entirety of which is incorporated herein by reference.

TECHNICAL FIELD

Network communications and in particular, verification and/or certification at least along a chain (i.e., logical and/or physical chain) of nodes implementing service functions.

BACKGROUND

Service chains (also referred to as service function chain) in networks correspond to a set of service functions. In particular, a service chain may define an ordered set of service functions that are to be applied to a packet and/or frames. A service function may refer a function that is responsible for a specific treatment of received packets or that perform a specific function on received packets. The service function may act at various layers of a protocol stack such as the network layer or other open system interconnection (OSI) layers. A service function may be implemented as a virtual element by a network node that may provide one or more service functions.

Some examples of a service function include one or more of deep packet inspection (DPI), firewalls, forwarding service, etc., where these service functions may be performed in a specific order on packets traversing the service chain in the network. For service chains, entities, companies, institutions, etc., may want proof that packets of a specific application were processed in accordance with predefined security policies, i.e., that certain service functions were performed on the packets before arrival at a destination. For example, if a packet is supposed to go through a specific service chain, proof that all packets actually go through all service functions of the service chain may be required.

In one example, a theoretical framework/signature scheme has been proposed to build a signature chain where the same message is signed by a set of entities for which the serial signing order is reflected in the signature. In this scheme, "serial" refers to where the order of every member/entity is specified. The structure of the signature may require: (1) unforgeability—regarding feasibility to contribute to a multisignature without knowing the private key; (2) extensibility—signature can be extended by new members; (3) non-interactivity—it is possible to extend the multisignature without interaction of previous signers; (4) constant size—the sign of the multisignature at any stage may be constant; (5) reorder protection—regarding feasibility to change the order each individual signer; and (6) truncation resilience—regarding feasibility to truncate the view of any signer who has previously contributed to the multisignature.

Another example relates to a scheme for service chain verification where the entire service chain is verified or it is not such that all the nodes are required to collaborate for verification. Other examples also relate to path verification as a whole where nodes on the path contribute to create the verification material for the VERIFIER. This example relies on symmetric cryptography, which may be hard to manage if the nodes in the service chain are frequently added and/or removed.

Further, communication systems such as $5^{th}$ Generation (5G, also referred to a New Radio (NR)) considers the collaboration between multiple entities and multiple administrative domains. Delegation of one or more service functions to another domain can be performed if a (high) level of trust is established between the collaborators. Such a constraint requiring a high level of trust may lower the potential for collaboration. An alternative is that the collaborative domain provides attestation that the one or more service functions are appropriately operated/performed. For example, 5G may be a multi-actor mobile network where several parties cooperate in the delivery of one or more services. Several virtualization technologies such as Network Function Virtualization (NFV), Software-Defined Networking (SDN), and concepts like network slicing are under discussion for implementation in 5G networks. In part due to the technologies and concepts under discussion, the three-party trust model (i.e., end user, Mobile Network Operator (MNO) and service provider) considered in the existing mobile generations may be replaced by models that include semi-trusted parties. 5G may be a multi-actor mobile network where several parties cooperate in the delivery of a given service function.

For example, a VNF may help ensure the Mobility Management function (MME VNF). This VNF may involve the following actors/entities and roles: VNF provider, the slice (i.e., network slice) owner, the slice provider, the VNF manager, and the infrastructure provider that are illustrated in FIG. 1 that shows MME VNF's dependencies. In such a complex environment, trust among parties may become important. Trust helps enable tracing and scoring of effort and performance of the different entities involved in a given one or more service functions to manage its server level agreement (SLA). This trust and liability system can be built on various mechanisms. One such mechanism relates to reputation propagation mechanisms (based on metrics such as the security and resiliency mechanisms used by each actor) that allow the entity to pinpoint the actor responsible of service outages.

The trust and liability system can also be based on remote or local attestation of a given property like the code integrity, the trustworthiness of the execution environment, the isolation of a slice and so forth. The capabilities of Trusted Execution Environment in network nodes may also re-enforce the security of this system. Besides, VNF Certifications can be a tool to build liability service chains. For instance, VNF certification mechanisms can certify the integrity of the VNF before being uploaded into the VNF catalog. This may enable the MNO to decide to deploy the VNF based on its trustworthiness (appropriate behavior/not misuse of network functions virtualization infrastructure (NFVI) resources) and the suitability (compliance, performance, etc.).

In addition to these mechanisms, agreements between different entities may be implemented. This multi-entity environment raises some challenges. One challenge relates to the MNO being able to verify the state of the mobile network and ensure its stability. Addressing this challenge may be a step toward security and resilience management of 5G. Another challenge for the MNO is to help ensure the security and privacy of end user data while adhering to Lawful Interception (LI) requirements while allowing for enhanced services where a service may be a network service provided by an operator that includes one or more service functions.

However, these existing system examples suffer from one or more deficiencies. In particular, one or more of these existing system examples assume the message traversing the service chain remains unchanged in transit along the service chain, and hence there are not checks performed for tampering of the message while the message traverses the service chain. Further, these existing system examples are configured to only decide/detect the validity of the message at the path end-point (e.g., destination point), thereby discarding packets only at the end of the service chain, which may waste network resources if, for example, a node towards the beginning of the service chain invalidates the packet. In other words, in this example, partial chain verification is not possible which may lead to a message being discarded at the end point VERIFIER even if the verification issues with the packet are with a less important service function. Further, relying on a shared secret strategy disadvantageously leads to third-party VERIFIERs being unable to independently certify the process and service chain.

SUMMARY

Some embodiments advantageously provide a method and system for verification and/or certification at least along a chain (i.e., logical and/or physical chain) of nodes implementing service functions.

One or more embodiments of the disclosure advantageously provide for generation of different types of attestations (e.g., process certification, link certification) that can be used to verify a proof of process by a service function (i.e., that a service function was performed on the packet) and proof of link between two service functions. These attestations may be generated by SIGNER nodes, each providing at least one service function in a service chaining architecture, and an independent VERIFIER that can verify the attestations for part of the service chain and/or the entire service chain. In one or more embodiments, a node such as an intermediate node may provide both signer functionality and VERIFIER functionality.

One or more embodiments may provide for added functionality with respect to partial service chain verification. For example, existing VERIFIERs implement an accept/reject only policy at the end of the service chain. This may be due all the entities (vendors) having to trust each other and share the same key. The failure in signing of one service function in this service chain is enough for the failure of the whole service chain. Such a characteristic of existing systems may not be suitable for a dynamic environment with multiple independent entities (vendors). The verification scheme described herein advantageously is able to operate in such an environment where operation issues result in either in one or more bad signature along the service chain and/or the inability of the VERIFIER to check one or more specific signatures for part of the service chain. This advantageously provides the network admin the ability to recover part of the traffic which otherwise would be rejected/dropped at the end of the service chain due to, for example, an invalid signature by a service function/node.

Further, the disclosure may provide one or more advantages:

1. Supports the verification of the service chain and content when the packet upon which the service function(s) in the service chain are performed is changed one or more times while traversing the service chain.

2. Allows the individual nodes along the service chain to discard wrong/invalid packets (i.e., packets that do not pass verification). Since each network function virtualization (NFV) in the service chain can act as a VERIFIER (and also a signer in one or more embodiments), the NFV can detect early mis-forwarded packets and drop them, flag them, report them, etc.

3. The VERIFIER may not be part of the trust model or can be one of the NFVs (i.e., nodes) at any position in the service chain. In other words, any entity (e.g., NFV) can verify the packet process.

4. The trust model is based on a public-private key that can be certified by a third party or the NVF provider. Therefore, different vendors (or providers of NFVs) can form the service chain where it is still possible to certify the process of the packets at desired NFVs with order preservation.

5. If the NFVs trust the VERIFIER, the VERIFIER can send some extra information to the NFVs to filter some traffic (rule-based or randomly).

6. If the NFVs trust the VERIFIER, the VERIFIER can send some extra information to the NFVs to filter some NFVs from the certification service chain.

7. Help improve the potential of collaboration as well as the increasing dynamic establishment of collaboration between partners/entities in the network.

According to one aspect of the disclosure, an intermediate node in communication with a first node is provided. The intermediate node comprising processing circuitry configured to receive a packet, the packet including metadata associated with first input data of the first node, first output data of the first node, a first process certification (PC) signature and a public cryptographic key associated with the first node, verify that the first PC signature corresponds to a process that led from the first input data of the first node to the first output data of the first node using the public cryptographic key, verify a link between first node and the intermediate node by comparing the received packet and the first output data of the first node, and determine whether to perform at least one service function on the packet based at least in part on the verification of the first PC signature and the verification of the link between the first node and the intermediate node.

According to one or more embodiments, the packet further includes metadata associated with second input of a second node, second output of the second node, a second PC signature and a public cryptographic key associated with the second node. The processing circuitry being further configured to: verify that the second PC signature corresponds to a process that led from the second input data of the second node to the second output data of the second node using the public cryptographic key, and verify a link between the second node and the first node by comparing the second output data of the second node and the first output data of the first node. The determination whether to perform at least one service function on the packet being based at least in part on the verification of the second PC signature and the verification of the link between the second node and the first node. According to one or more embodiments, the processing circuitry is further configured to verify the packet has traveled from the second node to the first node and then to the intermediate node by: verifying a first link certificate associated with the first node and the intermediate node in a logical node chain that the packet has traversed, and verifying a second link certificate associated with the first node and the second node in the logical node chain that the packet has traversed.

According to one or more embodiments, the processing circuitry is further configured to: perform a hash on the packet to generate a local input hash of the packet, compare the local input hash to the first output data of the first node, and the determining whether to perform at least one service function on the packet being based at least in part on the comparing of the local input hash and the first output data of the first node. According to one or more embodiments, the processing circuitry is further configured to: after performing the at least one service on the packet, perform a hash on the packet to generate a local output hash, and generate a local process certification at least in part by signing the local input hash and local output hash of the packet using a private cryptographic key associated with the intermediate node where the local process certification indicates the intermediate node performed at least one service function on the packet. According to one or more embodiments, the processing circuitry is configured to generate the local link certification at least in part by signing the first input data, first output data, the local input hash and local output hash using the private cryptographic key associated with the intermediate node where the local link certification indicates the intermediate node performed at least one service function on the packet after the first node performed at least one other service function on the packet.

According to one or more embodiments, the processing circuitry is further configured to modify the metadata to include the local process certification where the local link certification and a public cryptographic key being associated with the intermediate node. According to one or more embodiments, the processing circuitry is further configured to cause transmission of the modified metadata and the packet to a subsequent node. According to one or more embodiments, the metadata includes a respective output hash and respective input hash for a plurality of nodes in a logical node chain that the packet has traversed where the first input data corresponds to a first input hash and the first output data corresponding to a first output hash. The plurality of nodes includes the first node. The processing circuitry is further configured to verify a validity of the metadata associated with the plurality of nodes to detect at least one of tampering of the packet along the logical node chain and incorrect packet steering.

According to one or more embodiments, the metadata includes a plurality of process certifications and a plurality of public cryptographic keys associated with the plurality of nodes including the first node where each process certification is associated with a respective node in a logical node chain that the packet has traversed. The processing circuitry is further configured to verify a validity of at least one of the plurality of process certification using at least one of the plurality of public cryptographic keys to detect at least one of tampering of the packet along the logical node chain and incorrect packet steering. According to one or more embodiments, the metadata includes a plurality of link certifications and a plurality of public cryptographic keys associated with a plurality of nodes including the first node, each link certification being associated with a respective node and a prior node from the respective node in a logical node chain that the packet has traversed. The processing circuitry is further configured to verify a validity of at least one of the plurality of link certifications using at least one of the plurality of public cryptographic keys to detect at least one of tampering of the packet along the logical node chain and incorrect packet steering.

According to one or more embodiments, the verification is performed for each of the plurality of nodes in the logical node chain that the packet traversed. According to one or more embodiments, the verification is performed for at least one of the plurality of nodes that provides at least predefined service function on the packet where the verification is not performed for the remaining plurality of nodes that do not provide the at least one predefined service function on the packet. According to one or more embodiments, the verification fails for at least one of the plurality of nodes. The processing circuitry is further configured to, in response to the failed verification, one of: drop the packet, trigger an alert, and perform at least one service function on the packet. According to one or more embodiments, the first node is positioned immediately prior to the intermediate node in a logical node chain.

According to another aspect of the disclosure, a method implemented in an intermediate node in communication with a first node is provided. A packet is received where the packet includes metadata associated with first input data of the first node, first output data of the first node, a first process certification (PC) signature and a public cryptographic key associated with the first node. A verification is performed that the first PC signature corresponds to a process that led from the first input data of the first node to the first output data of the first node using the public cryptographic key. A verification is performed of a link between first node and the intermediate node by comparing the received packet and the first output data of the first node. A determination is made whether to perform at least one service function on the packet based at least in part on the verification of the first PC signature and the verification of the link between the first node and the intermediate node.

According to one or more embodiments, the packet further includes metadata associated with second input of a second node, second output of the second node, a second PC signature and a public cryptographic key associated with the second node. A verification is performed that the second PC signature corresponds to a process that led from the second input data of the second node to the second output data of the second node using the public cryptographic key. A verification of a link between the second node and the first node is performed by comparing the second output data of the second node and the first output data of the first node. The determination whether to perform at least one service function on the packet is based at least in part on the verification of the second PC signature and the verification of the link between the second node and the first node.

According to one or more embodiments, the packet is verified to have traveled from the second node to the first node and then to the intermediate node by: verifying a first link certificate associated with the first node and the intermediate node in a logical node chain that the packet has traversed, and verifying a second link certificate associated with the first node and the second node in the logical node chain that the packet has traversed. According to one or more embodiments, a hash is performed on the packet to generate a local input hash of the packet, and the local input hash is compared to the first output data of the first node. The determining whether to perform at least one service on the packet is based at least in part on the comparing of the local input hash and the first output data of the first node.

According to one or more embodiments, after performing the at least one service function on the packet, a hash is performed on the packet to generate a local output hash. A local process certification is generated at least in part by signing the local input hash and local output hash of the packet using a private cryptographic key associated with the intermediate node where the local process certification indicates the intermediate node performed at least one service function on the packet. According to one or more embodiments, the local link certification is generated at least in part by signing the first input data, first output data, the local input hash and local output hash using the private cryptographic key associated with the intermediate node where the local link certification indicates the intermediate node performed at least one service function on the packet after the first node performed at least one other service function on the packet.

According to one or more embodiments, the metadata is modified to include the local process certification, the local link certification and a public cryptographic key associated with the intermediate node. According to one or more embodiments, transmission of the modified metadata and the packet to a subsequent node is caused. According to one or more embodiments, the metadata includes a respective output hash and respective input hash for a plurality of nodes in a logical node chain that the packet has traversed where the first input data corresponds to a first input hash and the first output data corresponding to a first output hash and where the plurality of nodes includes the first node. A validity of the metadata associated with the plurality of nodes is verified to detect at least one of tampering of the packet along the logical node chain and incorrect packet steering.

According to one or more embodiments, the metadata includes a plurality of process certifications and a plurality of public cryptographic keys associated with the plurality of nodes including the first node where each process certification is associated with a respective node in a logical node chain that the packet has traversed. A validity of at least one of the plurality of process certification is verified using at least one of the plurality of public cryptographic keys to detect at least one of tampering of the packet along the logical node chain and incorrect packet steering. According to one or more embodiments, the metadata includes a plurality of link certifications and a plurality of public cryptographic keys associated with a plurality of nodes including the first node where each link certification is associated with a respective node and a prior node from the respective node in a logical node chain that the packet has traversed. A validity of at least one of the plurality of link certifications is verified using at least one of the plurality of public cryptographic keys to detect at least one of tampering of the packet along the logical node chain and incorrect packet steering.

According to one or more embodiments, the verification is performed for each of the plurality of nodes in the logical node chain that the packet traversed. According to one or more embodiments, the verification is performed for at least one of the plurality of nodes that provides at least predefined service function on the packet where the verification is not performed for the remaining plurality of nodes that do not provide the at least one predefined service function on the packet. According to one or more embodiments, the verification fails for at least one of the plurality of nodes. In response to the failed verification, one of: dropping the packet, triggering an alert, and performing at least one service on the packet. According to one or more embodiments, the first node is positioned immediately prior to the intermediate node in a logical node chain.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 10 is a diagram of variable length context headers according to one or more embodiments of the present disclosure.

DETAILED DESCRIPTION

Collaborations with mobile network operator (MNO) is one area where use cases involve collaborations between upstream MNO and downstream MNO or a service provider and an MNO. In both cases, the downstream MNO may be expected to perform a network service including one or more service functions on behalf of the upstream MNO or the service provider. As used herein in one or more embodiments, a network service may be a combination of an ordered set of service functions (SFs) organized as a service function chain (SFC) (also referred to as a service chain) where a node in the service chain may be configured to perform one or more SFs. In one or more embodiments, a network service refers to a Service Function Sub-Chain (SFSC) and/or a Service Function Full-Chain (SFCFC). In one or more embodiments, the SFCFC is the largest possible SFC that implements the network service that may start at the Classifier described herein and end with a terminating node. SFSC is any SFC included in the SFCFC. A logical node chain may correspond to the chain of a logical nodes, each of which performs at least one service function. A virtual network function (VNF), in one or more embodiments, may be used to provide service functions, SFCs, etc.

The MNO may be collaborating with other entities in different ways such as:

The downstream MNO is hosting the network services provided by the upstream MNO. For example, one entity provides to the downstream MNO a network service that is manufactured and orchestrated by the entity. The added value for the MNO may be low. In such scenarios, the Service Provider may trust the downstream MNO not to alter the connectivity or the network service provided by the Service Provider.

The downstream and upstream MNO have established a contract and trust each other. In this case, it may be expected that the network service run by the downstream provider is appropriately operated. Some Service Level Agreement may be established, however aside outage or major failures, it may be difficult for the upstream MNO to actually check, in real time, that the network service is appropriately performed. As a result, collaboration requires a high level of trust.

Figure 1:
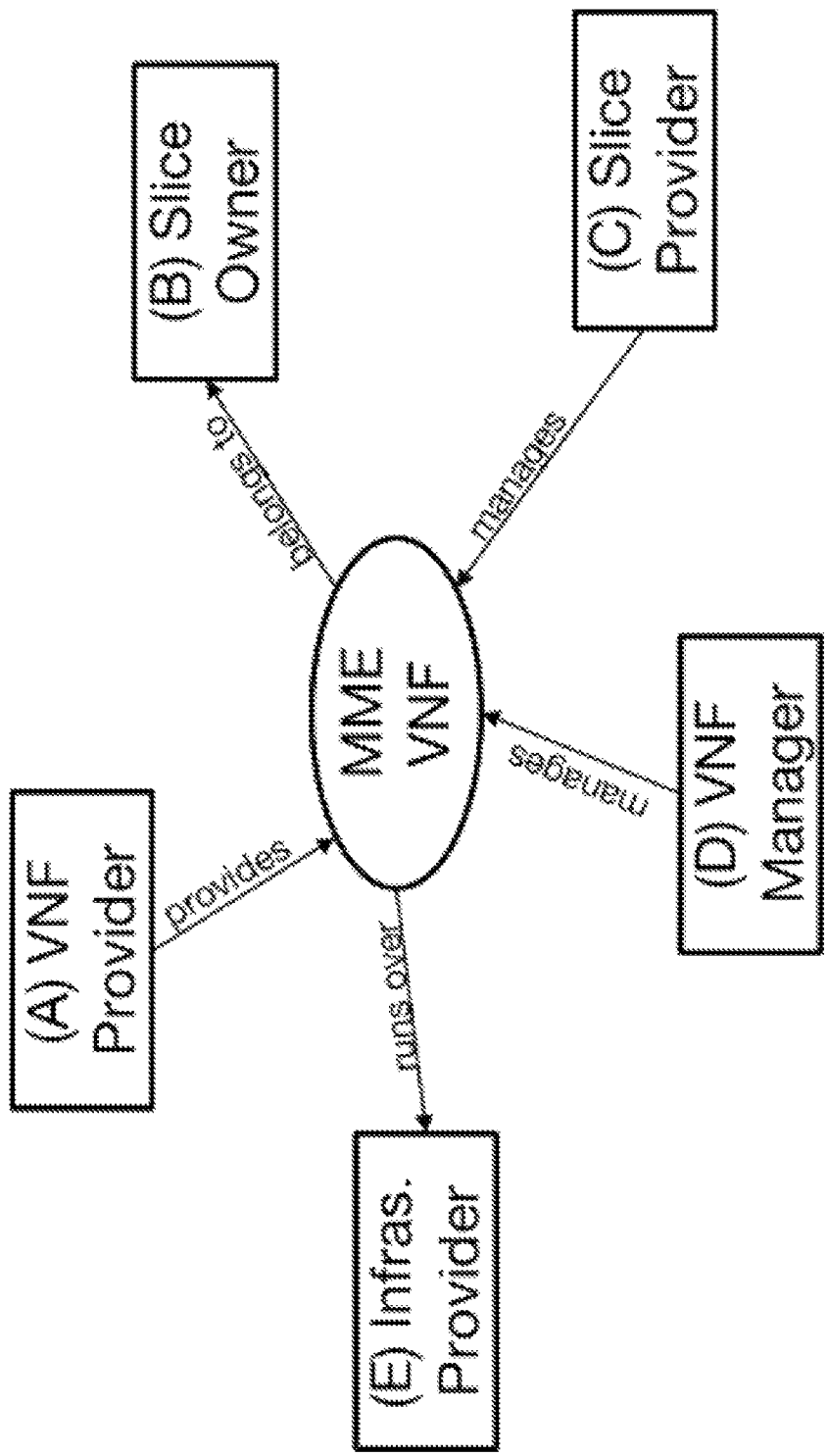
FIG. 1 is a diagram of an example of a MME VNF's dependencies.
Figure 2:
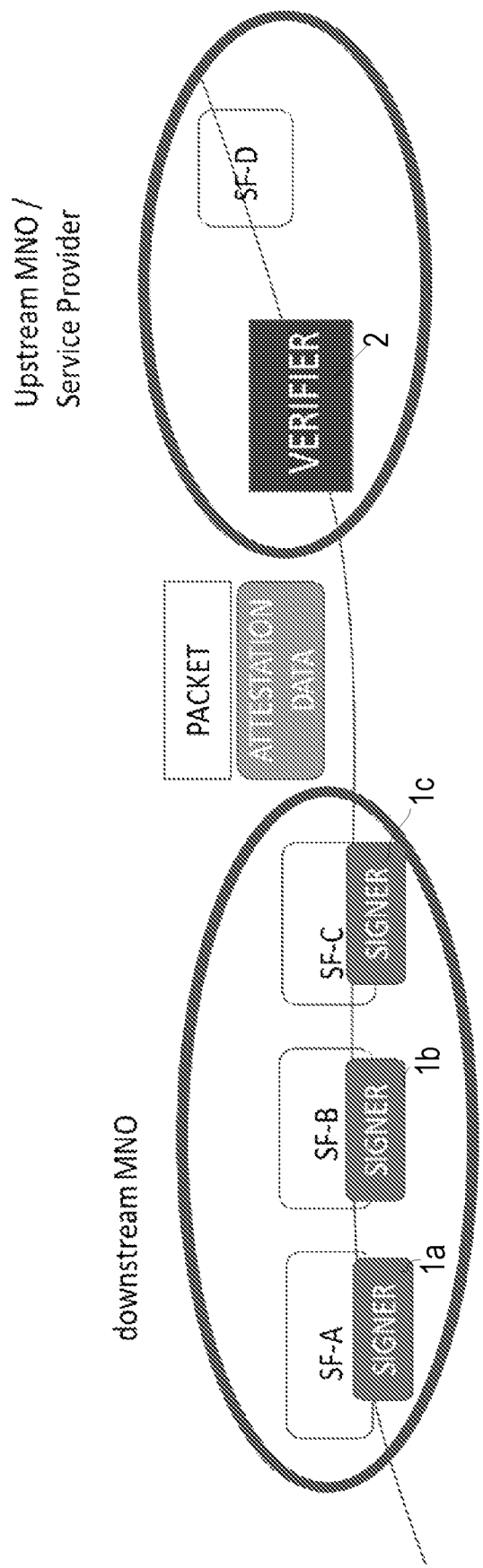
FIG. 2 is a diagram of collaboration between upstream MNO or a service provider and a downstream MNO.

FIG. 2 is a diagram of the collaboration between an upstream MNO or a Service Provider and a downstream MNO. The traffic flow is steered by the downstream MNO through a network service (SERVICE) requested by the Upstream MNO. The SERVICE may be instantiated as a SFC provided by one or more nodes where the SFC includes SFC-A, SFC-B and SFC-C. Upon receiving traffic that has supposedly traversed through the SERVICE, the upstream MNO may want to check that the SERVICE provided by the downstream MNO has actually been performed on the incoming packet such as based on information provided by each SIGNER 1a-1c (collectively referred to as SIGNER 1). Therefore, the downstream MNO attached some information to the packet which is then verified by the Upstream MNO by VERIFIER 2. The attached information may be referred to as the ATTESTATION DATA and is generated by the SIGNER functions of SIGNERs 1. More specifically the ATTESTATION DATA is an aggregation of SIGNER ATTESTATIONS generated by each SIGNERS1. The entity responsible for verifying and validating the correctness of the attached information is the VERIFIER function.

ATTESTATION DATA attached to the packet and steered to the upstream provider may use a network service header (NSH) that allows for encapsulation of an ethernet or IP packet into a network tunnel and for attachment of metadata (i.e., ATTESTATION DATA) to that packet. Other mechanisms for attaching metadata may be used as well. While NSH such as the NSH described in request for comment (RFC) 8300 and SFC may be expected to deploy within a single domain, Hierarchical Service Function Chaining (hSFC) may extend NSH to different administrative domains.

Other mechanisms may also be used to communicate this information, i.e., metadata or ATTESTATION DATA. For example, ATTESTION DATA may be communicated in batch mode every day. The VERIFIER 2 may have an oversight function and could define whether the SERVICE is operated by the downstream MNO as expected. The use of NSH may enable real time oversight.

The following may be used to describe one or more embodiments:

The ATTESTATION DATA that is provided by the downstream MNO to assert a network service and/or at least one service function and/or at least one SFC has been performed.

The SIGNER 1 that upon processing a packet generates SIGNER ATTESTATION which is aggregated to ATTESTATION DATA.

The VERIFIER 2 that upon receiving ATTESTATION DATA validates the ATTESTATION DATA and checks whether it matches one or more policies.

Additionally, described herein with respect to one or more embodiments is a way to reduce the resources for implementing such oversight mechanisms and/or to enable that oversight to be performed for only a subset of traffic, in one or more embodiments.

Depending on what the VERIFIER 2 oversight policy is, the VERIFIER 2 may perform a different validation and request the SIGNER 1 to produce different ATTESTATION DATA. In this example the VERIFIER 2 may want to check:

The packet has been steered through (SF-A, SF-B, SF-C) without undergoing any transformation between these SFs. Such VERIFICATION is described herein as SFC Validation and provides complete verification.

The packet has been steered by and/or through at least one or more specific SFs such as SFC-A and SFC-C. The order may be considered in one or more embodiments. The VERIFIER 2 (i.e., node with VERIFIER functionality) may consider a priority in the attestation data if additional service functions have been provided by additional intermediate SFC (e.g., SFC-B). Being able to validate that certain SFs in the service chain have been performed without having to validate that other SFs in the service chain have been performed allows for a reduction in the SIGNER 1's computing resource by reducing the number of SIGNER ATTESTATION computed and also may reduce the bandwidth resource(s) for carrying the ATTESTATION DATA. One or more of these benefits may also be realized by the VERIFIER 2 as less signer attestation data needs to be processed and less resources may be needed to communicate the reduced attestation data. Such verification may be considered a loose verification where policies may balance the trust and resource usage.

Figure 3:
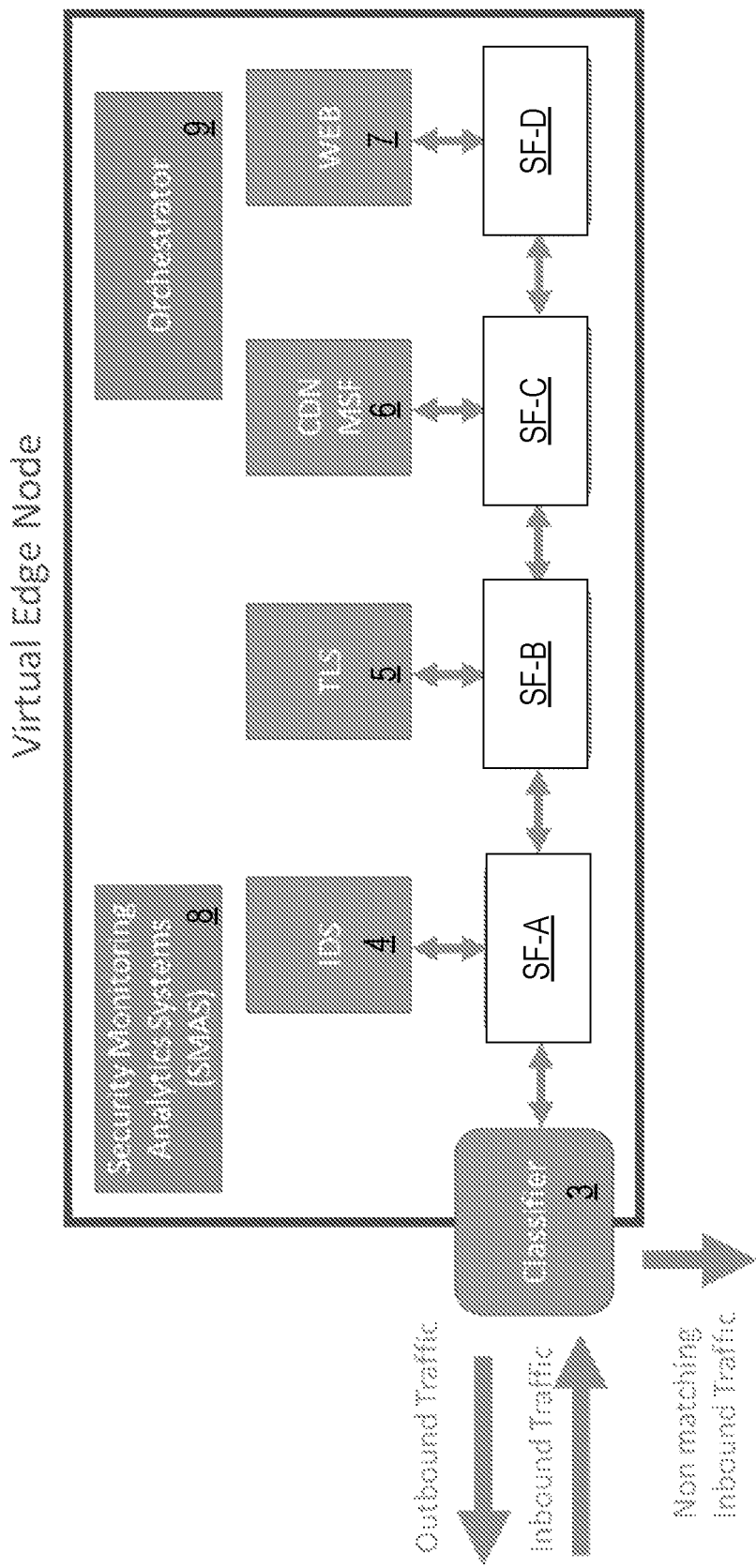
FIG. 3 is a diagram of a virtual edge node that includes an ordered chain of service functions (SFs)

Security Services:

While the interactions between SIGNERs 1 and VERIFIERs 2 may be used as an oversight mechanism between different domains. The interactions between SIGNERs 1 and VERIFIERs 2 may also be used as a security mechanism insurance within a SERVICE, i.e., network service, including a SFC. FIG. 3 provides an example of a Virtual Edge Node (VEN) that is defined by an ordered chain of SFs where VEN may be a logical node. VEN may include a classifier for classifying network traffic as is known in the art, instruction detection system 4 as is known in the art, transport layer security 5 (TLS 5) as is known in the art, content delivery network multiservice forum 6 (CDN MSF 6) as is known in the art, and WEB 7.

The network service may result in a more complex SFC. In such a situation, a SERVICE may provide some mechanisms to ensure that the packet is steered through the expected service functions (SFs). This may involve, for example, that upon receiving a packet, a SF may check whether the packet has been issued by the expected previous SF. In addition, the SF may check the packet has been steered through an expected chain.

Figure 4:
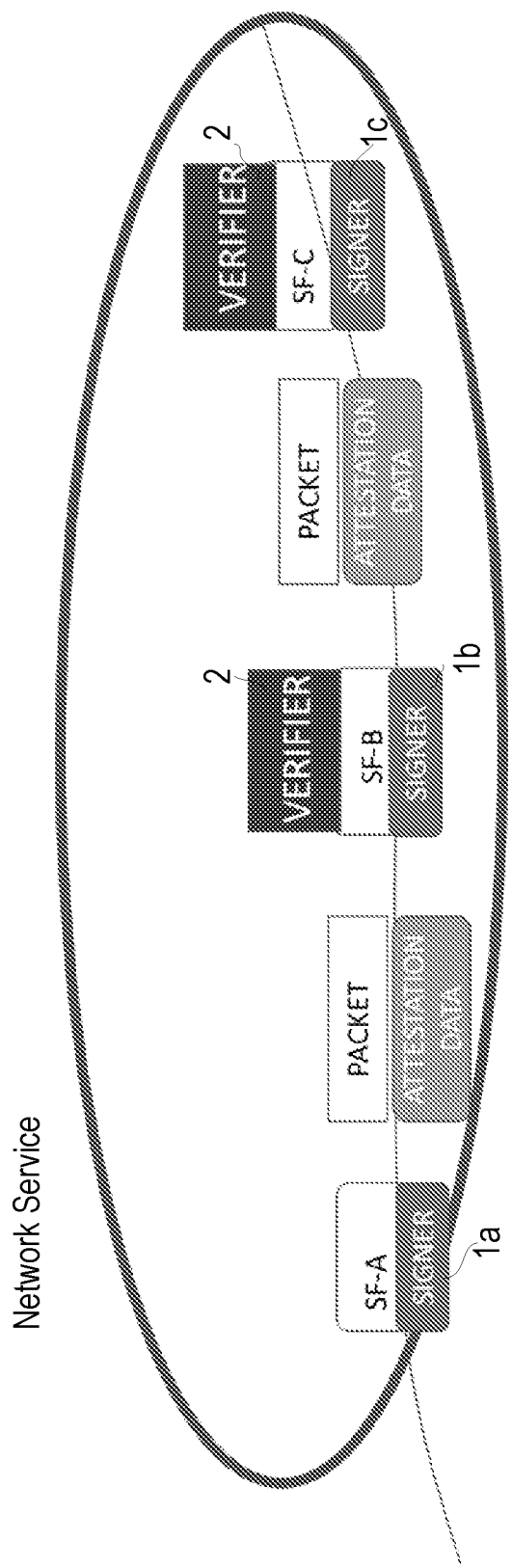
FIG. 4 is a diagram of a configuration of SFs that may include a SIGNER function and a VERIFIER function.

Therefore, in one or more embodiments, each SF may include a SIGNER 1 function and/or a VERIFIER 2 function as illustrated in FIG. 4. The VERIFIERs 2 and SIGNERs 1 may need to be appropriately configured on each SF. In such case, a VERIFIER 2 failing to validate the packet may result in discarding the packet.

Before describing in detail exemplary embodiments, it is noted that the embodiments reside primarily in combinations of apparatus components and processing steps related to verification and/or certification at least along a service chain that may correspond to logical and/or physical chain of nodes implementing service functions. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

A service chain may refer to a chain of service functions (i.e., service function chain) that may be implemented by one or more nodes. Therefore, in one or more embodiments, the service chain corresponds to a logical node chain where each node performs at least one service function.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for verification and/or certification at least along a service chain that corresponds and/or is provided by a logical and/or physical chain of nodes implementing service functions.

Figure 5:
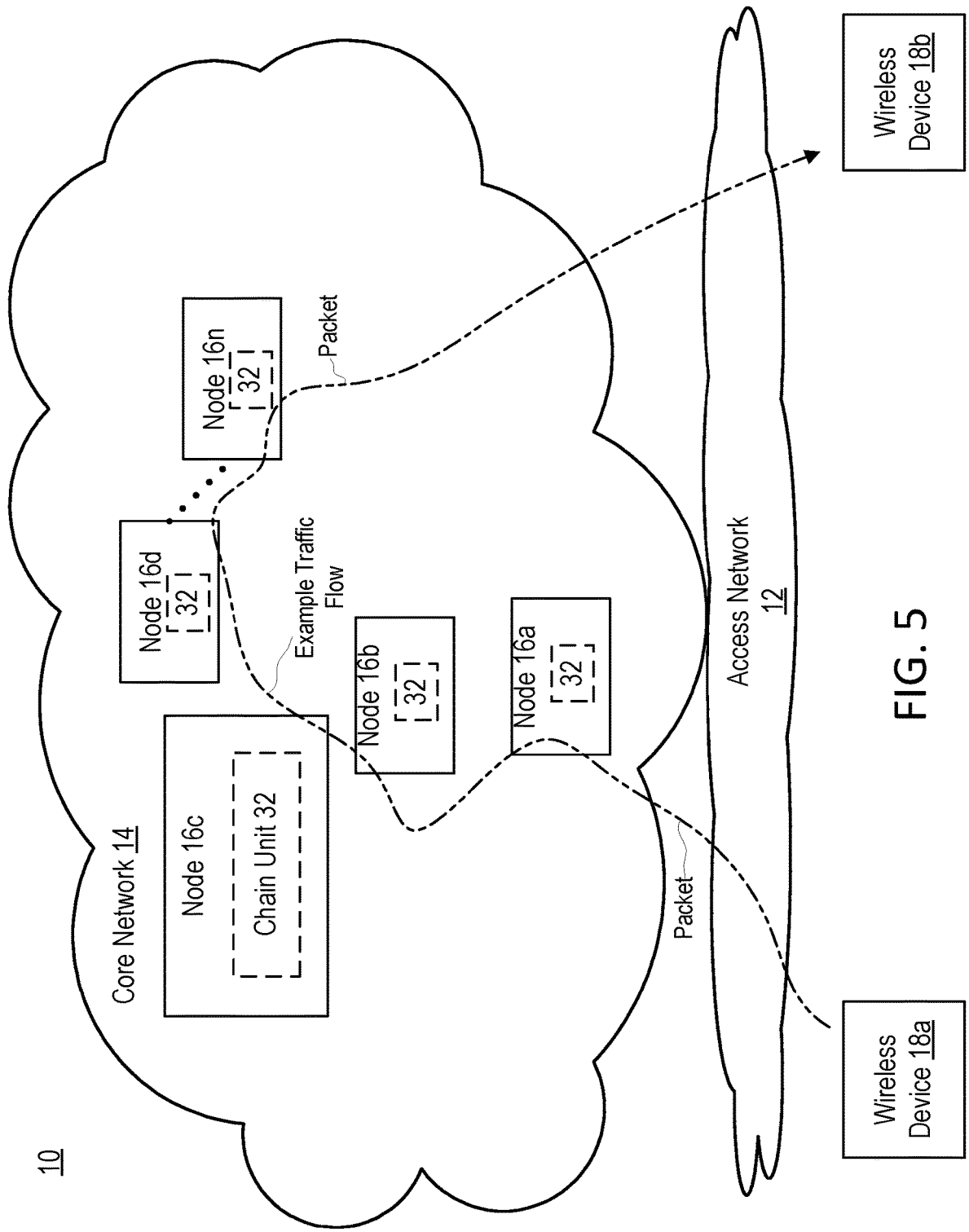
FIG. 5 is a diagram of an exemplary system in accordance with one or more embodiments of the present disclosure.

Referring now to the drawing figures, in which like elements are referred to by like reference numerals, there is shown in FIG. 5 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of nodes (not shown), such as NB s, eNBs, gNBs or other types of wireless access points. Each network node is connectable to the core network 14 over a wired or wireless connection. The core network 14 may include one or more nodes 16a-16n (collectively referred to as node 16) such as one or more physical and/or logical nodes for providing one or more service functions (SFs) and/or one or more service chains. Node 16 may be an entity in the core network such as a mobile management entity (MME) and/or other core network entity. As referred to herein for one or more embodiments, second node 16a corresponds a second node 16a, first node 16b corresponds to a first node 16b, intermediate node 16c corresponds to an intermediate node 16c, and subsequent node 16d corresponds to a subsequent node 16d. For example, in a service chain where SF-A is implemented by second node 16a, SF-B is implemented by first node 16b, SF-C is implemented by intermediate node 16c, and SF-D is implemented by subsequent node 16d, a packet traverses the service chain in the following order: second node 16a, first node 16b, intermediate node 16c and then subsequent node 16d, for example, where certain SFs are performed before other SFs.

Each SF may be configured to perform at least one function on a packet. A first wireless device (WD) 18a is configured to wirelessly connect to, or be paged by, the corresponding network node in access network 12. A second WD 18b is wirelessly connectable to the corresponding network node.

A node 16 is configured to include chain unit 32 which is configured to perform one or more network node 16 functions as described herein such as with respect to verification and/or certification at least along a service chain that corresponds to a logical and/or physical chain of nodes implementing service functions, as described herein. The traffic flow illustrated in FIG. 5 is just one example flow of one or more packets where other traffic flows through one or more nodes 16 are contemplated in accordance with the teachings of the present disclosure. Further, different initiator entities and/or destination entities are contemplated in accordance with the teachings of the disclosure.

Example implementations, in accordance with an embodiment, of the WD 18 and node 16 discussed in the preceding paragraphs will now be described with reference to FIG. 6. In a communication system 10, comprises a node 16 that includes hardware 20 enabling it to communicate with the WD 18 via the access network 12 and/or one or more other nodes 16. The hardware 20 may include a communication interface 22 for setting up and maintaining a wired or wireless connection with an interface of a different communication device of the communication system 10. The communication interface 22 may be configured to facilitate a connection to the access network 12 and/or other entities in core network 14.

In the embodiment shown, the hardware 20 of the node 16 further includes processing circuitry 24. The processing circuitry 24 may include a processor 26 and a memory 28. In particular, in addition to or instead of a processor, such as a central processing unit, and memory, the processing circuitry 24 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 26 may be configured to access (e.g., write to and/or read from) the memory 28, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the node 16 further has software 30 stored internally in, for example, memory 28, or stored in external memory (e.g., database, storage array, network storage device, etc.) accessible by the node 16 via an external connection. The software 30 may be executable by the processing circuitry 24. The processing circuitry 24 may be configured to control any of the methods and/or processes described herein and/or to cause such methods, and/or processes to be performed, e.g., by node 16. Processor 26 corresponds to one or more processors 26 for performing node 16 functions described herein. The memory 28 is configured to store data, programmatic software code and/or other information described herein. In some embodiments, the software may include instructions that, when executed by the processor 26 and/or processing circuitry 24, causes the processor 26 and/or processing circuitry 24 to perform the processes described herein with respect to node 16. For example, processing circuitry 24 of the node 16 may include chain unit 32 configured to perform one or more node 16 functions as described herein such as with respect to verification and/or signing at least along a service chain that may correspond to a logical and/or physical chain of nodes implementing at least one service function, as described herein. In one or more embodiments, node 16 provides one or more functions described herein via virtualization of one or more functions on hardware 36.

The communication system 10 further includes the WD 18 already referred to. The WD 18 may have hardware 36 that may include a radio interface 38 configured to set up and maintain a wireless connection with a network node in the access network 12. The radio interface 38 may be formed as or may include, for example, one or more RF transmitters, one or more RF receivers, and/or one or more RF transceivers.

The hardware 36 of the WD 18 further includes processing circuitry 40. The processing circuitry 40 may include a processor 42 and memory 44. In particular, in addition to or instead of a processor, such as a central processing unit, and memory, the processing circuitry 40 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 42 may be configured to access (e.g., write to and/or read from) memory 44, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 18 may further comprise software 46, which is stored in, for example, memory 44 at the WD 18, or stored in external memory (e.g., database, storage array, network storage device, etc.) accessible by the WD 18. The software 46 may be executable by the processing circuitry 40. The software 46 may include a client application 48. The client application 48 may be operable to provide a service to a human or non-human user via the WD 18. The client application 48 may interact with the user to generate the user data that it provides.

The processing circuitry 40 may be configured to control any of the methods and/or processes described herein and/or to cause such methods, and/or processes to be performed, e.g., by WD 18. The processor 42 corresponds to one or more processors 42 for performing WD 18 functions described herein. The WD 18 includes memory 44 that is configured to store data, programmatic software code and/or other information described herein. In some embodiments, the software 46 and/or the client application 48 may include instructions that, when executed by the processor 42 and/or processing circuitry 40, causes the processor 42 and/or processing circuitry 40 to perform the processes described herein with respect to WD 18.

Figure 6:
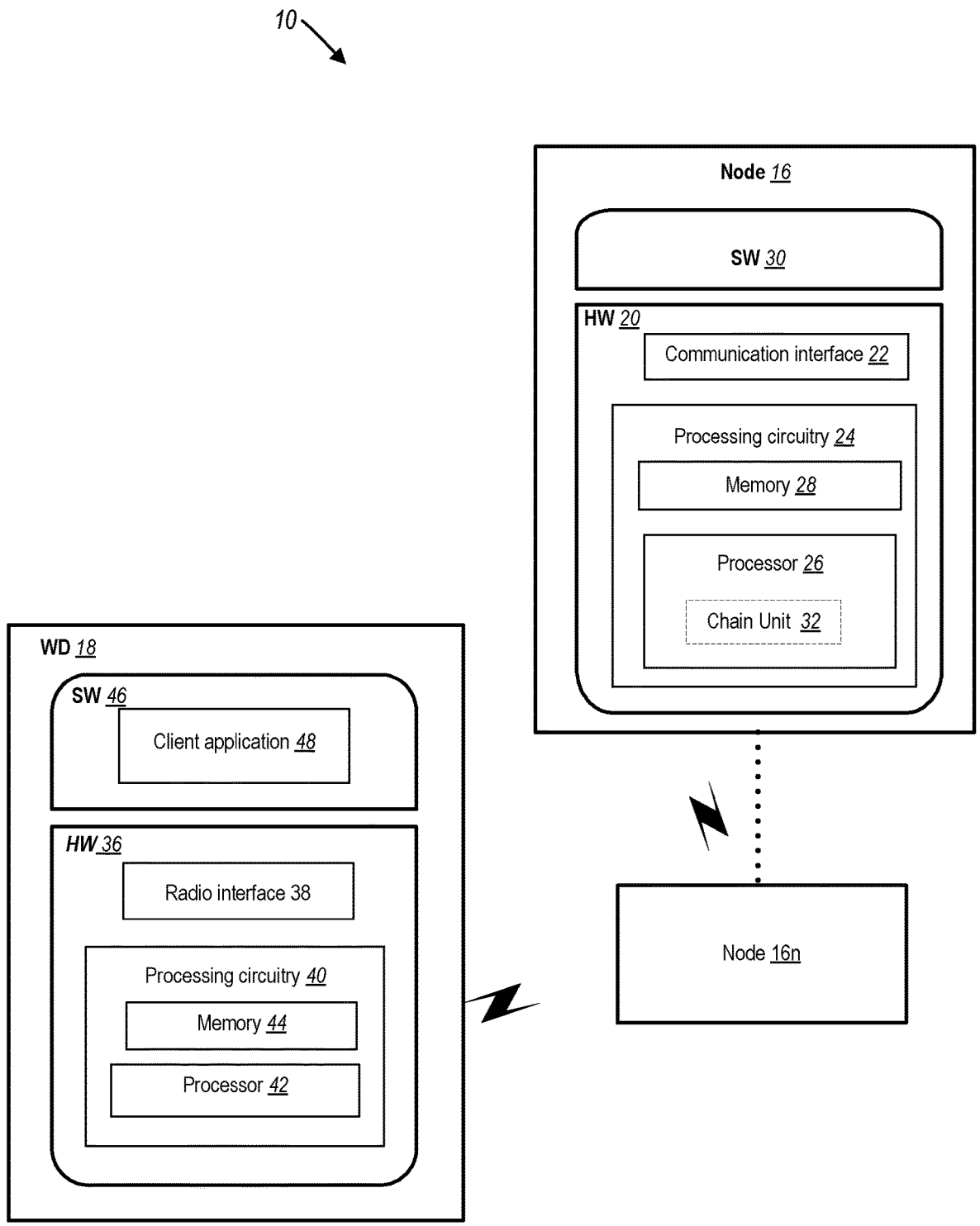
FIG. 6 is a diagram block diagram of various entities of the system of FIG. 5 in accordance with one or more embodiments of the present disclosure.

In some embodiments, the inner workings of the node 16 and WD 18 may be as shown in FIG. 6 and independently, the surrounding network topology may be that of FIG. 5.

Although FIGS. 5 and 6 show chain unit 32 as being within a respective processor, it is contemplated that this unit and/or other units may be implemented such that a portion of the unit is stored in a corresponding memory within the processing circuitry. In other words, the units may be implemented in hardware or in a combination of hardware and software within the processing circuitry.

Figure 7:
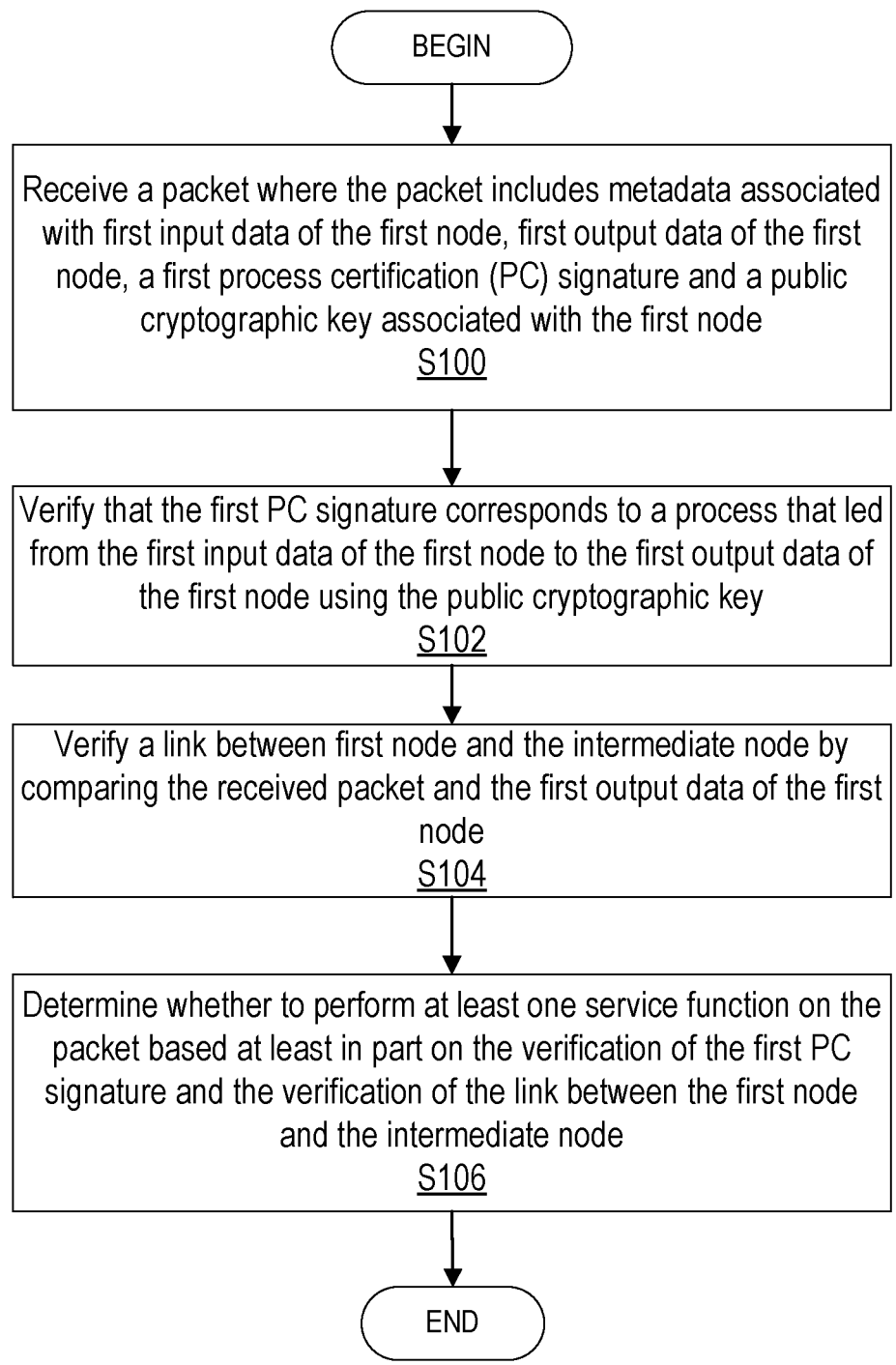
FIG. 7 is a flowchart of an example process according to one or more embodiments of the present disclosure.

FIG. 7 is a flowchart of an exemplary process in a node 16 according to one or more embodiments of the disclosure. One or more Blocks and/or functions performed by node 16 may be performed by one or more elements of node 16 such as by chain unit 32 in processing circuitry 24, processor 26, communication interface, etc. In one or more embodiments, node 16 such as via one or more of processing circuitry 24, processor 26, chain unit 32, communication interface 22, etc. is configured to receive (Block S100) a packet where the packet includes metadata associated with first input data of the first node 16b, first output data of the first node 16b, a first process certification (PC) signature and a public cryptographic key associated with the first node 16b, as described herein.

In one or more embodiments, node 16 such as via one or more of processing circuitry 24, processor 26, chain unit 32, communication interface 22, etc. is configured to verify (Block S102) that the first PC signature corresponds to a process that led from the first input data of the first node 16b to the first output data of the first node 16b using the public cryptographic key, as described herein. In one or more embodiments, node 16 such as via one or more of processing circuitry 24, processor 26, chain unit 32, communication interface 22, etc. is configured to verify (Block S104) a link between first node 16b and the intermediate node 16c by comparing the received packet and the first output data of the first node 16b, as described herein. In one or more embodiments, node 16 such as via one or more of processing circuitry 24, processor 26, chain unit 32, communication interface 22, etc. is configured to determine (Block S106) whether to perform at least one service function on the packet based at least in part on the verification of the first PC signature and the verification of the link between the first node 16b and the intermediate node 16c, as described herein.

According to one or more embodiments, the packet further includes metadata associated with second input of a second node 16a, second output of the second node 16a, a second PC signature and a public cryptographic key associated with the second node 16a. The processing circuitry 24 being further configured to: verify that the second PC signature corresponds to a process that led from the second input data of the second node 16a to the second output data of the second node 16a using the public cryptographic key, and verify a link between the second node 16a and the first node 16b by comparing the second output data of the second node 16a and the first output data of the first node 16b. The determination whether to perform at least one service function on the packet being based at least in part on the verification of the second PC signature and the verification of the link between the second node 16a and the first node 16b. According to one or more embodiments, the processing circuitry 24 is further configured to verify the packet has traveled from the second node 16a to the first node 16b and then to the intermediate node 16c by: verifying a first link certificate associated with the first node 16b and the intermediate node 16c in a logical node chain that the packet has traversed, and verifying a second link certificate associated with the first node 16b and the second node 16a in the logical node chain that the packet has traversed.

According to one or more embodiments, the processing circuitry 24 is further configured to: perform a hash on the packet to generate a local input hash of the packet, compare the local input hash to the first output data of the first node 16b, and the determining whether to perform at least one service function on the packet being based at least in part on the comparing of the local input hash and the first output data of the first node 16b. According to one or more embodiments, the processing circuitry 24 is further configured to: after performing the at least one service function on the packet, perform a hash on the packet to generate a local output hash, and generate a local process certification at least in part by signing the local input hash and local output hash of the packet using a private cryptographic key associated with the intermediate node 16c where the local process certification indicates the intermediate node 16c performed at least one service function on the packet. According to one or more embodiments, the processing circuitry 24 is configured to generate the local link certification at least in part by signing the first input data, first output data, the local input hash and local output hash using the private cryptographic key associated with the intermediate node 16c where the local link certification indicates the intermediate node 16c performed at least one service function on the packet after the first node 16b performed at least one other service function on the packet.

According to one or more embodiments, the processing circuitry 24 is further configured to modify the metadata to include the local process certification where the local link certification and a public cryptographic key being associated with the intermediate node 16c. According to one or more embodiments, the processing circuitry 24 is further configured to cause transmission of the modified metadata and the packet to a subsequent node 16d. According to one or more embodiments, the metadata includes a respective output hash and respective input hash for a plurality of nodes 16 in a logical node chain that the packet has traversed where the first input data corresponds to a first input hash and the first output data corresponding to a first output hash. The plurality of nodes 16 includes the first node 16b. The processing circuitry 24 is further configured to verify a validity of the metadata associated with the plurality of nodes 16 to detect at least one of tampering of the packet along the logical node chain and incorrect packet steering.

According to one or more embodiments, the metadata includes a plurality of process certifications and a plurality of public cryptographic keys associated with the plurality of nodes 16 including the first node 16b where each process certification is associated with a respective node in a logical node chain that the packet has traversed. The processing circuitry 24 is further configured to verify a validity of at least one of the plurality of process certification using at least one of the plurality of public cryptographic keys to detect at least one of tampering of the packet along the logical node chain and incorrect packet steering. According to one or more embodiments, the metadata includes a plurality of link certifications and a plurality of public cryptographic keys associated with a plurality of nodes 16 including the first node 16b, each link certification being associated with a respective node 16 and a prior node 16 from the respective node 16 in a logical node chain that the packet has traversed. The processing circuitry 24 is further configured to verify a validity of at least one of the plurality of link certifications using at least one of the plurality of public cryptographic keys to detect at least one of tampering of the packet along the logical node chain and incorrect packet steering.

According to one or more embodiments, the verification is performed for each of the plurality of nodes 16 in the logical node chain that the packet traversed. According to one or more embodiments, the verification is performed for at least one of the plurality of nodes 16 that provides at least predefined service function on the packet where the verification is not performed for the remaining plurality of nodes 16 that do not provide the at least one predefined service function on the packet. According to one or more embodiments, the verification fails for at least one of the plurality of nodes 16. The processing circuitry 24 is further configured to, in response to the failed verification, one of: drop the packet, trigger an alert, and perform at least one service function on the packet. According to one or more embodiments, the first node is positioned immediately prior to the intermediate node 16c in a logical node chain.

Having described the general process flow of arrangements of the disclosure and having provided examples of hardware and software arrangements for implementing the processes and functions of the disclosure, the sections below provide details and examples of arrangements for verification and/or certification at least along a service chain that may corresponds to a logical and/or physical chain of nodes implementing service functions.

Figure 8:
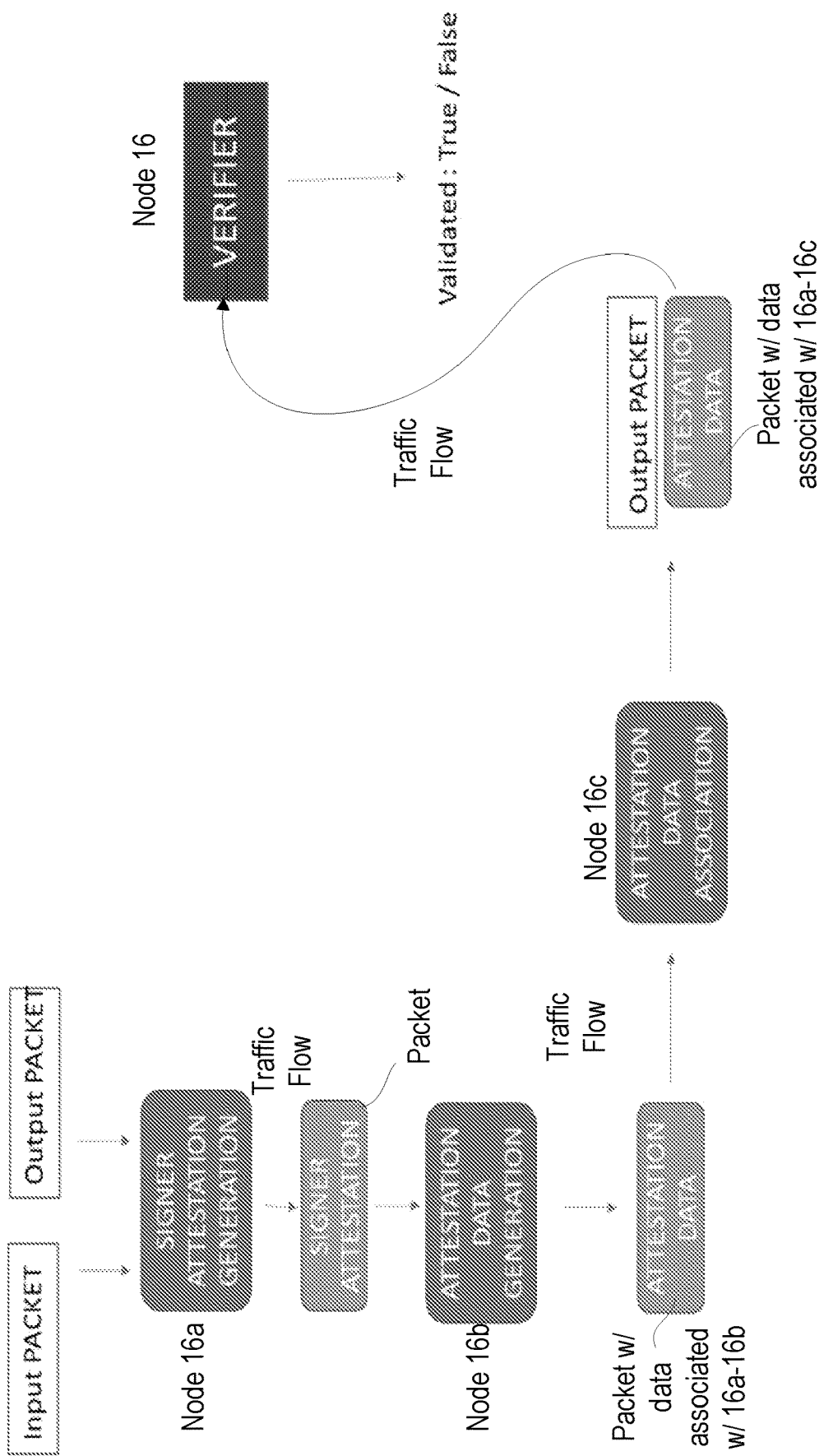
FIG. 8 is a diagram of a trust model.

Embodiments provide verification and/or signing at least along a service chain that may correspond to a logical and/or physical chain of nodes 16 implementing service functions.
Architecture Overview One or more embodiments, described herein define the interactions between one or more SIGNERS implemented by one or more node 16 and one or more VERIFIERs implemented by one or more nodes 16, as illustrated in FIG. 8. In particular, the embodiment of FIG. 8 may correspond to where there is one VERIFIER that determines whether the service chain is valid. In one or more embodiments, one or more nodes 16 along the service chain may perform a partial service chain validation and/or VERIFIER functions. In one or more embodiments, while a SIGNER may perform some verifications such as verifying a certified process happened after another certified process, the VERIFIER verifies the process certification and/or link certifications for various nodes 16 along service chain. In one or more embodiments, the SIGNER and VERIFIER are functions that can be co-located on node 16 or can be located at different node 16 where the SIGNERS and VERIFIERS still interact. The VERIFIER may be logically positioned at the end of the network service and be configured to perform, for example, partial chain verification. The network service may correspond to a service chain including six service functions (SF1-SF6) where VERIFIER may, for partial chain verification, verify any one or more SFs but not all SFs in the service chain. For example, VERIFIER may check/verify SF3-SF5 of SF1-SF6. In one or more embodiments, the verification or checking performed by VERIFIER may involve checking for successive changes of the packet while traversing the service chain.

Interactions between SIGNERS and a VERIFIER are represented below:

As used herein in one or more embodiments, the SIGNER is a function provided by node 16 such as via one or more of processing circuitry 24, processor 26, chain unit 32, communication interface 22, etc. that takes/accepts as input an input packet of the SF (i.e., node 16) and outputs an output packet of the SF. The SIGNER may generate the SIGNER ATTESTATION (e.g., process certification and/or link certification) where the SIGNER ATTESTATION is chained to, i.e., attached to, the ATTESTATION DATA (i.e., metadata). The ATTESTATION DATA may be associated with the outgoing packet, i.e., to a packet output by the SF.

The VERIFIER implemented by node 16 may take/accept such as via one or more of processing circuitry 24, processor 26, chain unit 32, communication interface 22, etc. as input the PACKET with the associated ATTESTATION DATA (i.e., metadata) and return a statement True or False based at least in part on the results of the validation. In one or more embodiments, the SIGNERS and VERIFIERS are configured according to one or more security policies.

A trust model of the architecture may include splitting the roles between the SIGNER and the Service Provider, or MNO providing the SERVICE and the VERIFIER as illustrated in FIG. 8 where the VERIFIER is in a different domain from the SIGNERs. The separation of these roles provides a higher level of trust in the model than other one or more other configurations. More specifically, the trust associated with the ATTESTATION DATA may rely on trust associated with the SF. In one or more embodiments, a SF may be considered to be trusted as this entity is provided by trusted vendors while the contract is being established between MNOs. In other words, one or more SFs are independent from the MNO and may therefore be expected to be trusted.

The SIGNERS' ATTESTATION is signed by a private key, i.e., private cryptographic key, that is certified, for example by, the first entity, while the collaboration may be set between a second entity and a third entity. This private cryptographic key association may be the reason why the second or third entity may trust the attestations. If attestations are signed by one MNO (second entity) and the agreement is placed between the second entity and the third entity, the level of trust may be lower and may therefore additional auditing mechanisms may be implemented.
Details As described herein, node 16 may provide a service function (SF); however, the teachings are equally applicable to node 16 providing more than one SF.

Attestation Data (i.e., Metadata):

Each service function (SF) has a role of performing such as via one or more of processing circuitry 24, processor 26, chain unit 32, communication interface 22, etc. the function on the packet traversing a service chain that may correspond to a logical node chain. However, as described herein in one or more embodiments, the SF has a secondary role to certify such as via one or more of processing circuitry 24, processor 26, chain unit 32, communication interface 22, etc. that the packet is processed by the SF: this certification is referred to herein as a process certification (PC). The SF may also provide a second certification that certifies the link between itself and the previous SF such as in a previous node 16 in the chain: this certification is referred to as a link certification (LC). As used herein, the node 16 performing the PC and/or LC may be an intermediate node 16c, for example, in a logical node chain of nodes 16 that that packet is to traverse. PC and/or LC provide the one or more building blocks for one or more embodiments described herein.

PC Details

A process certification may be a certification that proves and/or attest such as via one or more of processing circuitry 24, processor 26, chain unit 32, communication interface 22, etc. that a certain SF (i.e., node 16) with a certified key ($SF_{key}$), i.e., certified cryptographic key, from a vendor (or a trusted third party) has processed the packet.

LC

A link certification is a certification that proves and/or attest such as via one or more of processing circuitry 24, processor 26, chain unit 32, communication interface 22, etc. that a certified process happened after another, i.e., previous, certified process with no modification on the packet occurring between the two certified processes.

The Metadata

The metadata contains the information (i.e., attestation data) of PCs and LCs from different SFs (i.e., nodes 16) plus the hashes, for example, of the packet at the input and output of each SF that may be associated with SF(s) that were performed on the packet.

An example of a metadata assembly in json format is provided below but the metadata is not limited to this configure and may be provided in other configurations.

Metadata is a follows:

```
{
  {
    "sf-key":"xxxxxl",
    "input-hash":"xxxxxx",
    "output-hash":"xxxxxx",
    "time":"xxxxxx",
    "order-in-chain": "xxxxxx",
    "PC":"xxxxxx",
    "LC":"xxxxxx"},
  {
    "sf-key":"xxx3xx",
    "input-hash":"xxxxxx",
    "output-hash":"xxxxxx",
    "time":"xxxxxx",
    "order-in-chain": "xxxxxx",
    "PC":"xxxxxx",
    "LC":"xxxxxx"},
  ...
}
``` where sf-key represent the public key (i.e., public cryptographic key) of the SF, i.e., node 16, and may be used as an identifier for that part of the metadata and the signatures, otherwise the VERIFIER may need to check the signatures against all the SFs which may consume computation resources).

Input-hash and output-hash represent the hashes of the packet when the packet is received by the SF and when the packet is leaving the SF. If the packet is not modified, the input-hash and output-hash may be the same value.

PC is the process certification and may be calculated such as via one or more of processing circuitry 24, processor 26, chain unit 32, communication interface 22, etc. as follows: $PC=sign_{SF\text{-}key\text{-}private}(\{input\text{-}hash, outputhash, time, order\text{-}in\text{-}chain\})$. The PC certifies that the SF (i.e., node 16) with $SF_{KEY}$ received the packet with input-hash and processed it at time and produced a packet with output-hash. In one or more embodiments, the PC may also certify the order of processed packet by providing its order-in-chain number in the MD.

LC is the link certification and calculated such as via one or more of processing circuitry 24, processor 26, chain unit 32, communication interface 22, etc. as follows: $LC=Sign_{SF\text{-}key\text{-}private}(\{input\text{-}hash\text{-}prev, output\text{-}hash\text{-}prev, time\text{-}prev, order\text{-}in\text{-}chain\text{-}prev, PC\text{-}prev, input\text{-}hash, output\text{-}hash, time, order\text{-}in\text{-}chain, PC\})$. In other words, the LC certifies that the process at the SF (i.e., node 16) occurred after a previously certified process at a previous node 16, for example, with no modification to the packet occurring between the two certified processes.

While the example metadata described above is described as including various data such as sf-key, input-hash, output-hash, time, order-in-chain, PC and LC, one or more of these may be omitted while still allowing for PC and/or LC functionality to be performed. Further, using a hash function is one implementation where other functions are equally applicable according to one or more embodiments of the disclosure.

SIGNER— intermediate SF (e.g., node 16) in the service chain

Various examples are described below where different functionality is provided. In one or more embodiments, one or more nodes 16 may be configured the according to one or more of the following example algorithms below. For example, second node 16a performs the signer algorithm of Example 1 via chain unit 32 while intermediate node 16c performs the signer algorithm of Example 3 via chain unit 32. Other configurations are possible in accordance with the teachings of the disclosure.

Example 1: Signer Algorithm (Base for PC Only)

ON NSH-packet ARRIVED at node 16 such as intermediate node 16c
PARSE NSH-packet to metadata (MD) and input-packet
SET input-hash-computed to hash(input-packet)
PERFORM THE SERVICE FUNCTION ON packet AND
GENERATE output-packet
SET output-hash-computed to hash(output-packet)
SET pc to sign({input-hash-computed,output-hash-computed})
SET md to {input-hash-computed,output-hash-computed, current-time, order-in-chain,pc}
APPEND md to MD and reconstruct the NSH-packet-out
SIGNER with some verification functionality—intermediate SF in service chain Therefore, in the Signer algorithm (base for PC only) a service function at node 16 is performed on a received packet that is not verified, and the metadata is modified to include PC generated by the node 16. As used herein, the data generated and/or computed by the node 16 performing a service function may be referred to a local data such that, in this example, node 16 generates local PC, local output hash, local input hash, etc.

Example 2: Signer Algorithm (PC Only with Some Verifications Performed)

ON NSH-packet ARRIVED at node 16
PARSE NSH-packet to MD and input-packet
SET input-hash-computed to hash(input-packet)
VERIFY MD for the last (i.e., previous node) node in the service chain and/or logical node chain, if not verified: Drop NSH-PACKET, HALT
PERFORM THE SERVICE FUNCTION ON packet AND GENERATE output-packet
SET output-hash-computed to hash(output-packet)
SET pc to sign({input-hash-computed,output-hash-computed})
SET md to finput-hash-computed,output-hash-computed, current-time, order-in-chain,pc
APPEND md to MD and reconstruct the NSH-packet-out
SIGNER PC and LC functionality—intermediate SF in service chain Example 2 is similar to Example 1 except that node 16 such as via one or more of processing circuitry 24, processor 26, chain unit 32, communication interface 22, etc. verifies the metadata associated the previous node 16 (i.e., first node 16) before determining whether to perform a service function on the packet, thereby allowing for partial chain verification where the packet may be verified by an intermediate node 16c in the logical node chain that the packet traverses and/or is configured to traverse. This example of partial chain verification may only verify the chain back to the previous node 16, but other examples are possible where one or more previous nodes 16 may be verified by node 16.

Example 3: Signer Algorithm (Base for PC and LC)

ON NSH-packet ARRIVED at node 16
PARSE NSH-packet to MD and input-packet
SET input-hash-computed to hash(input-packet)
VERIFY MD for the last node in the chain, if not verified:
    Drop NSH-PACKET, HALT
SET pc-prev to last node pc
SET input-hash-computed-prev to last node input-hash-computed
SET output-hash-computed-prev to last node output-hash-computed
SET current-time-prev to last node current-time
SET order-in-chain-prev to last node order-in-chain
PERFORM THE SERVICE FUNCTION ON packet AND GENERATE output-packet
SET output-hash-computed to hash(output-packet)
SET pc to sign({input-hash-computed,output-hash-computed})
SET lc to sign({input-hash-computed,output-hash-computed,current-time, order-in-chain,pc,input-hash-computed-prev,output-hash-computed-prev,current-time-prev, order-in-chain-prev,pc-prev})
SET md to {input-hash-computed,output-hash-computed, current-time, order-in-chain,pc,input-hash-computed-prev,output-hash-computed-prev,current-time-prev, order-in-chain-prev,pc-prev,lc}
APPEND md to MD and reconstruct the NSH-packet-out
VERIFIER— at intermediate node 16c and/or final node 16 in service chain that may correspond to a logical node chain.

Example 3 includes steps from Example 1 and 2 where Example 3 includes further steps related to performing a link certification, as described herein.

Example 4: Verifier Algorithm (Base for PC and LC)

ON NSH-packet ARRIVED at node 16
PARSE NSH-packet to MD and input-packet
SET input-hash-computed to hash(input-packet)
FOR node SET to first-node in chain to last-node in chain:
    VERIFY PC
    VERIFY LC
    IF PC or LC not verified:
        Drop PACKET, raise an alarm, halt The VERIFIER algorithm allows an intermediate node 16c in the logical node chain to perform various verification steps for one or more nodes 16 coming before, in time and logically, to node 16 that is performing the verification. Also, the verification algorithm described herein advantageously enables a network admin to implement different policies for one or more signatures that are not verified in, for example, PC and/or LC. There may be various reasons for a network operator or entity to be unable to verify a signature (i.e., attestation data) such as losing the key (i.e., cryptographic key), not having the key, or the signature operation was not performed properly by a function, among other reasons. In one or more of these cases, existing systems may simply reject the packet at the end of the service chain using existing verification schemes. However, one or more embodiments described herein advantageously enables the SF (e.g., node 16 such as intermediate node 16c or final node 16 in service chain) to validate the service chain with known errors. Further, in one or more embodiments described herein, the service function does not sign the packet properly (the point of failure) may be identified.

Further, existing algorithms need to know the exact order in the service chain and if there is a change in the service chain, all the nodes including the VERIFIER may need to be synced to the new changes. However, in one or more embodiments described herein, there is no requirement for knowledge of how the chain is constructed as each link verification (e.g., link between two SFs) may be independently performed such that the SF order of the entire service chain is not needed to validate the service chain. Further, the VERIFIER algorithm described herein may also allow for out of order signature verification such that a signature of a SF/node 16 appearing later in the service chain may be validated before a signature of a SF/node 16 appearing earlier in the service chain.

Figure 9:
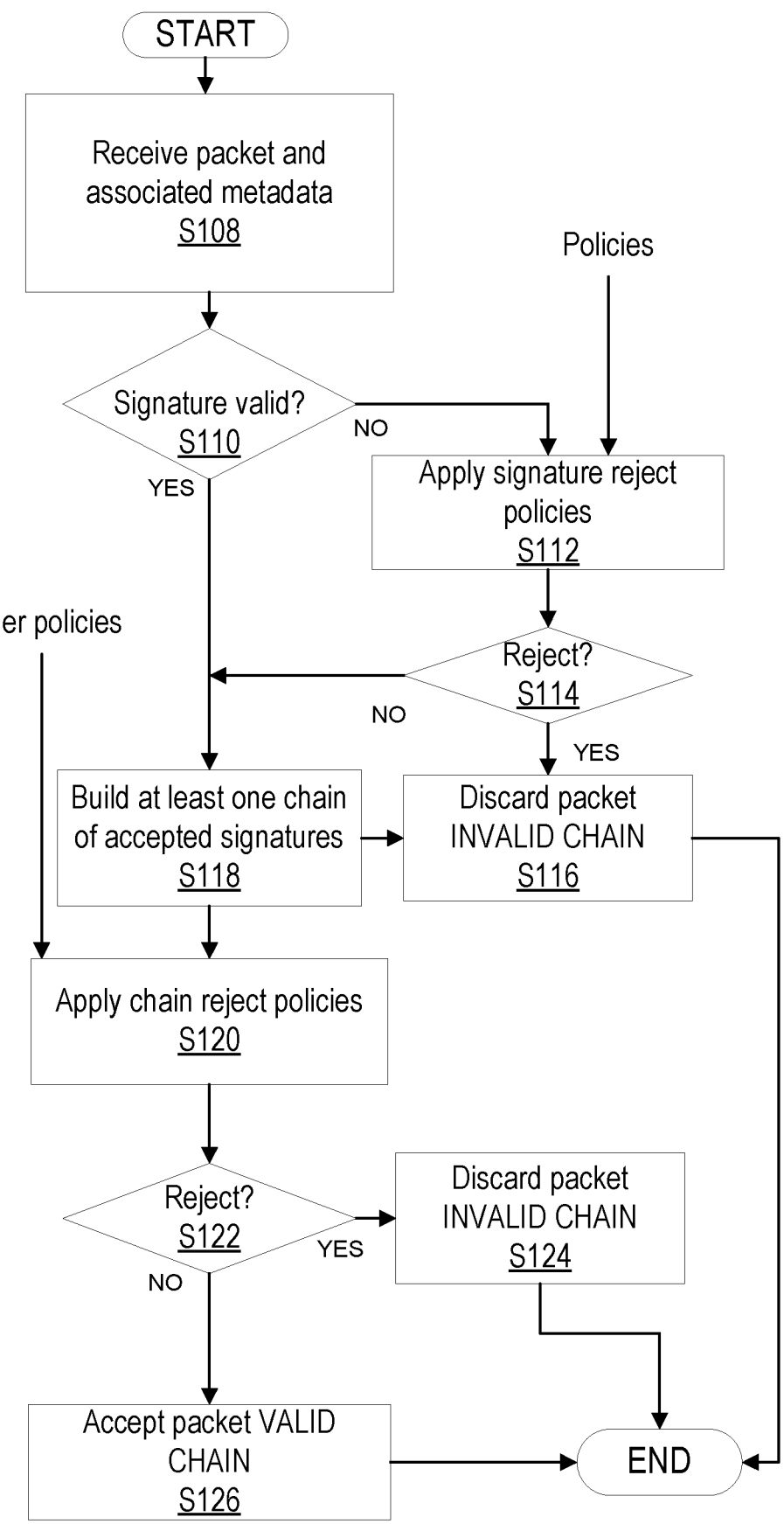
FIG. 9 is a flowchart of another example process according to one or more embodiments of the present disclosure.

FIG. 9 is a flow diagram of an example process for process a packet according to one or more embodiments of the disclosure. One or more Blocks and/or functions performed by node 16 may be performed by one or more elements of node 16 such as by chain unit 32 in processing circuitry 24, processor 26, etc. In one or more embodiments, node 16 such as via one or more of processing circuitry 24, processor 26, chain unit 32, communication interface 22, etc. is configured to receive (Block S108) a packet and associated metadata. In one or more embodiments, node 16 such as via one or more of processing circuitry 24, processor 26, chain unit 32, communication interface 22, etc. is configured to determine (Block S110) whether the signature is valid such as by verifying at least one PC signature in the metadata, as described herein.

In one or more embodiments, node 16 such as via one or more of processing circuitry 24, processor 26, chain unit 32, communication interface 22, etc. is configured to, if the signature is not valid, apply (Block S112) a signature reject policies. The signature reject policies may include one or more of a priority of the service functions associated with the signature (i.e., some service functions may be more important than other, etc.), type of error with signature (e.g., lost key, wrong signing operation, etc.), among other policies. A signature check or verification may result in "True" or "False". In one or more embodiments, the signature reject policies may be binary where the packet is discarded when a signature verification fails. On the other hand, some policies may not reject the packet but may, depending on the type of SF, raise a signal or alarm. The decision by node 16 whether to reject the traffic may be performed depending on the severity of the network service, which may be when the risk of an attack to, for example, the packet is believed to be low. One or more embodiments may consider operational practice, when a signature is known to be false. In this case, the verification of one signature may also not result in the packet being rejected. One or more embodiments may include a SIGNER whose key has been lost. In this case the signature cannot be generated and will fail. Similarly, a SIGNER may generate a wrong signature or the VALIDATOR may not be able to interpret the format of the signature of the SIGNER. This may result from a bad implementation of the SF that needs to be patched or unsupported algorithms. While this may be addressed, an operator may choose to ignore the validation during that time.

In one or more embodiments, node 16 such as via one or more of processing circuitry 24, processor 26, chain unit 32, communication interface 22, etc. is configured to determine (Block S114) whether to reject the packet with an invalid signature based at least in part on at least one signature reject policy. In one or more embodiments, node 16 such as via one or more of processing circuitry 24, processor 26, chain unit 32, communication interface 22, etc. is configured to, if the determination is made to reject the packet, discard (Block S116) the packet due to an invalid chain.

Referring back to S110, in one or more embodiments, node 16 such as via one or more of processing circuitry 24, processor 26, chain unit 32, communication interface 22, etc. is configured to, if the signature is valid, build (Block S118) at least one chain of accepted signatures. For example, in one or more embodiments, node 16 such as via one or more of processing circuitry 24, processor 26, chain unit 32, communication interface 22, etc. processes metadata for all previous nodes 16 to build one or more chains of accepted signatures (e.g., PC signatures and/or LC signature associated with the service chain). In one or more embodiments, node 16 such as via one or more of processing circuitry 24, processor 26, chain unit 32, communication interface 22, etc. is configured to, apply (Block S120) chain reject policies to the at least one service chain of accepted signatures. In one or more embodiments, one or more chain reject policies corresponds to one or more of: a packet did not pass a certain node 16, a packet passed a certain node 16, a packet traversed the SFC or at least one node 16 in a wrong order, a signature cannot be verified, no signature is attached, etc.

In one or more embodiments, node 16 such as via one or more of processing circuitry 24, processor 26, chain unit 32, communication interface 22, etc. is configured to, determine (Block S122) whether to reject the packet based at least in part on the at least one chain of accepted signatures. In one or more embodiments, node 16 such as via one or more of processing circuitry 24, processor 26, chain unit 32, communication interface 22, etc. is configured to, if the determination is made to reject the packet, discard (Block S124) the packet with an invalid chain. In one or more embodiments, node 16 such as via one or more of processing circuitry 24, processor 26, chain unit 32, communication interface 22, etc. is configured to, if the determination is made to accept the packet, accept (Block S126) the packet with a valid chain.

The process of FIG. 9 may be performed by a VERIFIER such as a node 16 at the end of the service chain or outside of the service chain and/or by an intermediate node 16c in the service chain.

Implementation of One or More Embodiments with NSH

Several ways to implement different embodiments with NSH are as follows:

1. Carry the ATTESTATIONs (e.g., in metadata) with the packet,
2. Log the ATTESTATIONs in each node 16, and/or
3. Log the ATTESTATIONs in a central node 16.

As long as the VERIFIER (i.e., node 16) is able to get ATTESTATIONs (e.g., in the metadata) such as by either one of the above methods, the VERIFIER may be able to perform a verification described herein.

In one or more embodiments for partial traffic verification (i.e., verification of a portion of the service chain), the VERIFIER may need to generate such as via one or more of processing circuitry 24, processor 26, chain unit 32, communication interface 22, etc. a random seed and determine how much of the traffic may need to be verified. The VERIFIER may then encrypt such as via one or more of processing circuitry 24, processor 26, chain unit 32, communication interface 22, etc. the information (e.g., attestation) with the cryptographic key of each NFV, i.e., node 16, in the service chain and send this information directly to the NFVs or to the packet initiator to be included in the packet.

In one or more embodiments, the VERIFIER may also send such as via one or more of processing circuitry 24, processor 26, chain unit 32, communication interface 22, etc. extra information to one or more NFVs, for example, regarding the partial chain verification (a subset of service chain or arbitrary nodes) or special requests for each NFV. Some examples of this extra information may include one or more of a vendor, name of the service function, certificate such as a public key, etc. NSH is one standard protocol for service chaining, where in one or more embodiments, a new type of metadata for NSH for carrying the information for the chain verification for each packet is provided, as described herein. Further, while NSH is described herein, the teachings of the disclosure are equally applicable to other standards that may be configured to communicate the data/information described herein.

FIG. 10 is a diagram of a format for NSH having optional variable-length metadata for including the information (e.g., PC, LC, etc.) described herein. This format is further described as follows:

Metadata Class (MD Class): Defines the scope of the Type field to provide a hierarchical namespace. The MD Class values can be allocated to standards bodies, vendors, and others.

Type: Indicates the explicit type of metadata being carried. One or more definitions of the Type may be the responsibility of the MD Class owner.

Unassigned bit: One unassigned bit is available for future use. This bit may not be set and may be ignored on receipt by the intermediate node 16c.

Length: Indicates the length of the variable-length metadata (MD) in bytes. In case the metadata length is not an integer number of 4-byte words, the sender (e.g., intermediate node 16c) may add pad bytes immediately following the last metadata byte to extend the metadata to an integer number of 4-byte words. The receiver (e.g., node 16) may round the Length field up to the nearest 4-byte-word boundary, to locate and process the next field in the packet. The node 16 may access only those bytes in the metadata indicated by the Length field (i.e., actual number of bytes) and may ignore the remaining bytes up to the nearest 4-byte-word boundary. The length may be 0 or greater. A value of 0 may indicate a Context Header without a Variable-Length Metadata field.

In one or more embodiments, a new MD class (SHASC class) may be registered with IANA. In particular, IANA has set up the "NSH MD Class" registry, which contains 16-bit values. New allocations may be made according to the following policies:
0x0000 to 0x01ff: IETF Review
0x0200 to 0xfff5: Expert Review
IANA has assigned the values as follows:

TABLE of the NSH MD Class

| Value | Meaning | Reference |
|---|---|---|
| 0x0000 | IETF Base NSH MD Class | RFC 8300 |
| 0xfff6 to 0xfffe | Experimental | RFC 8300 |
| 0xffff | Reserved | RFC 8300 |

A registry for Types for the MD Class of 0x0000 is defined in RFC such as Section 9.1.5 of RFC 8300.

New allocation requests from the "Expert Review" range may consider whether a new MD class is needed compared to adding MD Types to an existing class. The existence of an associated and publicly visible registry of MD Types may be considered.

When evaluating a request for an allocation, it can be verified whether the allocation plan includes considerations to handle privacy and security issues associated with the anticipated individual MD Types allocated within this class. These plans may consider, when appropriate, alternatives such as indirection, encryption, and limited-deployment scenarios. Information that may not be directly derived from viewing the packet contents may be examined for privacy and security implications.

And within the SHASC class different types may need to be defined to carry different types of information.

NSH and Filtering Mechanism

Seed Generation for Partial Traffic Verification

The VERIFIER, i.e., node 16, may generate such as via one or more of processing circuitry 24, processor 26, chain unit 32, communication interface 22, etc. a random seed (e.g., 128 bits). Then, the VERIFIER may choose/select such as via one or more of processing circuitry 24, processor 26, chain unit 32, communication interface 22, etc. how much of the traffic may need to be verified and may encode that selection such as in 128 bits. For example, if one percent of the traffic needs to be verified, the VERIFIER may encode such as via one or more of processing circuitry 24, processor 26, chain unit 32, communication interface 22, etc. ($2^{128}-1$)/100 in 128 bits and put this encoding logically in front of the random seed bits. Then, the VERIFIER may use such as via one or more of processing circuitry 24, processor 26, chain unit 32, communication interface 22, etc. each NVF key to encrypt the 256 bits of generated data and may send all the encrypted data to the initiator (i.e., to the node 16 that sent the NSH packets to the service chain). The initiator may create such as via one or more of processing circuitry 24, processor 26, chain unit 32, communication interface 22, etc. NSH metadata based on this information and may include the NSH metadata in the packets bound for the service chain. Since this action associated with NSH metadata may have and/or cause performance issues and since the seed information may not change frequently, this information may be sent once to the NFVs (where an NFV is part of the SFC) in the service chain, for example, and cached there.

Special Request (Signature Required) for Partial Traffic Verification

Since it may not be required for all the service functions in the service chain to sign all the packets, the VERIFIER may choose/select such as via one or more of processing circuitry 24, processor 26, chain unit 32, communication interface 22, etc. which of the one or more NFVs in the service chain may sign the packets. However, if the packet is modified in an NFV (i.e., node 16), it may be mandatory for the NFV to sign the packet regardless of special request information as the signature of the NFV may be needed to verify the continuity of the chain of service functions in the service chain. For this purpose, the VERIFIER may assemble such as via one or more of processing circuitry 24, processor 26, chain unit 32, communication interface 22, etc. a binary number where the least significant bit represents the first service function in the chain and the second least significant bit represent the second service function in the chain and so on. If the bit is set to 1, the signature is required and if the bit is set to 0, the signature is not required, in this example.

The content of the 256 bits of the special request can be encrypted such as via one or more of processing circuitry 24, processor 26, chain unit 32, communication interface 22, etc. symmetrically based on a generated seed such as to provide an extra level of protection. The content of encrypted 256 bits of the special request may be sent such as via one or more of processing circuitry 24, processor 26, chain unit 32, communication interface 22, etc. to initiator to include in the packets.

Special Request (Other Special Requests)

The method described above may be used to deliver any other special request to the NFVs (i.e., nodes 16) through a secure channel. For example, the VERIFIER may ask/request such as via one or more of processing circuitry 24, processor 26, chain unit 32, communication interface 22, etc. the NFVs to perform a special logging or a special process of the packet.

Packet Received by Each NFV, i.e., by Each Node 16

When a packet is received by an NFV, the NFV may first determine if the NFV needs to verify and sign the packet or not.

If Seed Data is Present

If the seed random information exists or is present in the packet, then the NFV may locate the encrypted seed that is corresponding to its own and decrypt it and split it to two numbers: Seed number S and partial traffic number P. If the S and P are present in the NFV cache, there may be no need for the decryption process to be performed.

In one example, when the S and P are known, the NFV may evaluate the following condition:

Hash256(hash256(original packet) XOR S) MOD $2^{128}$<P

If TRUE, the NFV verifies and signs the packet.

if special request data is present

If the special request information exists, then the NFV may decrypt this information based on S described above, and locate its corresponding bit. If the corresponding bit is set to 1, the NFV verifies and signs the packet. However, in one or more embodiments, it may be mandatory for the NFV to sign the packet regardless of this bit if the content of the packet is modified with this NFV.

Verifying the Chain from the Initiator to this NFV

The verification process is similar to the verification process in the VERIFIER, described above.

Signing the Packet

If the NFV is to sign the packet, the NFV produces the signature (e.g., PC signature) and stores it along with the hash of the packet after processing the packet in the NFV, i.e., after applying a service function to the packet. If the NFV is not to sign the packet, however, the NFV may provide a random number as a signature such as to confuse an attacker or an unauthorized entity attempting to modify the packet.

To generate the signature as described herein, the NFV may generate a hash based on the content of input packet hash and the content of output packet hash and sign the hashes and record it in the packet in its corresponding position/order. In one or more embodiments, the NFVs may encrypt the hashes and signatures based on a symmetric key (e.g., seed number S) for extra protection.

Packet Received by VERIFIER at Node 16

In one or more embodiments, a final step may involve verification of the chain and content at the VERIFIER, i.e., node 16. The VERIFIER already has the S and P, as described above, and can evaluate the TRUE/FALSE condition described herein to determine if the packet is valid.

For the packets that the condition is TRUE, the VERIFIER node can verify the service chain based on the public keys (i.e., one or more public cryptographic keys) from each service function which are certified by their vendor.

As described herein, in one or more embodiments, the verification of the packet/MD may start from the last NFV in the service chain and may recursively continue until the initiator of the packet is reached, thereby verifying the entire service chain. For example, for the last NFV (i.e., node 16 immediately before the VERIFIER node 16), the VERIFIER node 16 has the hash or input and output of this NFV such that the VERIFIER node 16 can verify if these two hashes are signed by the last NFV. The VERIFIER may then verify the hashes, for example, for all other NFVs (i.e., other nodes 16 in the logical node chain/service chain), for example. In one or more embodiments, the VERIFIER node 16 may then verify if the output of each NVF in the service chain matches with the input of the immediate NFV after that NFV in the service chain. If these verifications for the MD are successful, the service chain and the content are verified.

In case of partial chain verification, some of the nodes 16 may not sign the packet such as if signing the packet was not required by the nodes 16. However, it is still possible to verify the service chain without having the signature of these one or more nodes 16/NFVs that did not sign, as described herein. For example, if the content of the packet is not modified in an NFV, then the hash of input and output of that function is identical. Therefore, in that case, the VERIFIER is able to remove those NFV functions from the nodes 16 from the chain and verify the remaining partial chain with the existing hash array and signature array.

The teachings of the present disclosure provide one or more advantages described herein. For example, a mechanism involving a set of SIGNERs and at least one VERIFIER is provided where the mechanism allows for a SF operator, i.e., node 16, to provide ATTESTATION DATA to attest the operation of a SERVICE defined as a SFC of SF. This includes attestation of a given SF as well as the expected path including any SF that have transformed the packet.

Loose attestation is also provided such as attestation of an ordered set of SFs, of an unordered set of SFs, of a sub chain, etc.

SIGNERS and VERIFIERS may be in the same domain or in different domains.

Also, the mechanism involving a set of SIGNERS and a set of VERIFIERS allows for an SF operator to secure SFC, by enabling each SF to check that the incoming packet has been steered along the expected path, i.e., expected service chain. The mechanism also allows for a SF to attest that it has processed a given packet. The mechanism also allows a set of SIGNERs and a VERIFIER to select a subflow where ATTESTATION DATA is generated.

In one or more embodiments, the "VERIFIER" (i.e., node 16) may be a final node 16 in the logical node chain, a node immediately after the last/final node 16 in the logical node chain, and/or an intermediate node 16c, where at least one previous node 16 to VERIFIER node 16 and/or the entire logical chain is verified as described herein. In one or more embodiments, the "signer" may be a node 16 in the logical node chain the performs a signature function. In one or more embodiments, one or more nodes 16 include both signer and VERIFIER functionality.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
LC Link Certificate
PC Process Certificate
SF Service Function It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. An intermediate node in communication with a first node, a second node, and an intermediate node comprising processing circuitry configured to:
   receive a packet, the packet including metadata associated with first input data of the first node, first output data of the first node, a first process certification (PC) signature and a public cryptographic key associated with the first node;
   verify that the first PC signature corresponds to a process that led from the first input data of the first node to the first output data of the first node using the public cryptographic key;
   verify a link between first node and the intermediate node by comparing the received packet and the first output data of the first node;
   determine whether to perform at least one service function on the packet based at least in part on the verification of the first PC signature and the verification of the link between the first node and the intermediate node;
   verify that a second PC signature corresponds to a process that led from input data of the second node to output data of the second node using the public cryptographic key;
   verify a link between the second node and the first node by comparing the second output data of the second node and the first output data of the first node; and
   the determination whether to perform at least one service function on the packet being based at least in part on the verification of the second PC signature and the verification of the link between the second node and the first node.

2. The intermediate node of claim 1, wherein the processing circuitry is further configured to verify the packet has traveled from the second node to the first node and then to the intermediate node by:
   verifying a first link certificate associated with the first node and the intermediate node in a logical node chain that the packet has traversed; and
   verifying a second link certificate associated with the first node and the second node in the logical node chain that the packet has traversed.

3. The intermediate node of claim 1, wherein the processing circuitry is further configured to:
   perform a hash on the packet to generate a local input hash of the packet;
   compare the local input hash to the first output data of the first node; and
   the determining whether to perform at least one service function on the packet being based at least in part on the comparing of the local input hash and the first output data of the first node.

4. The intermediate node of claim 3, wherein the processing circuitry is further configured to:
   after performing the at least one service function on the packet, perform a hash on the packet to generate a local output hash; and
   generate a local process certification at least in part by signing the local input hash and local output hash of the packet using a private cryptographic key associated with the intermediate node, the local process certification indicating the intermediate node performed at least one service function on the packet.

5. The intermediate node of claim 4, wherein the processing circuitry is configured to generate a local link certification at least in part by signing the first input data, first output data, the local input hash and local output hash using the private cryptographic key associated with the intermediate node, the local link certification indicating the intermediate node performed at least one service function on the packet after the first node performed at least one other service function on the packet.

6. The intermediate node of claim 5, wherein the processing circuitry is further configured to modify the metadata to include the local process certification, the local link certification and a public cryptographic key being associated with the intermediate node.

7. The intermediate node of claim 6, wherein the processing circuitry is further configured to cause transmission of the modified metadata and the packet to a subsequent node.

8. The intermediate node of claim 1, wherein the metadata includes a respective output hash and respective input hash for a plurality of nodes in a logical node chain that the packet has traversed, the first input data corresponding to a first input hash and the first output data corresponding to a first output hash, the plurality of nodes including the first node; and
   the processing circuitry is further configured to verify a validity of the metadata associated with the plurality of nodes to detect at least one of tampering of the packet along the logical node chain and incorrect packet steering.

9. The intermediate node of claim 8, wherein the verification is performed for each of the plurality of nodes in the logical node chain that the packet traversed.

10. The intermediate node of claim 8, wherein the verification is performed for at least one of the plurality of nodes that provides at least predefined service function on the packet, the verification not being performed for the remaining plurality of nodes that do not provide the at least one predefined service function on the packet.

11. The intermediate node of claim 8, wherein the verification fails for at least one of the plurality of nodes; and
the processing circuitry is further configured to, in response to the failed verification, one of:
drop the packet;
trigger an alert; and
perform at least one service function on the packet.

12. The intermediate node of claim 1, wherein the metadata includes a plurality of process certifications and a plurality of public cryptographic keys associated with the plurality of nodes including the first node, each process certification being associated with a respective node in a logical node chain that the packet has traversed; and
the processing circuitry is further configured to verify a validity of at least one of the plurality of process certification using at least one of the plurality of public cryptographic keys to detect at least one of tampering of the packet along the logical node chain and incorrect packet steering.

13. The intermediate node of any claim 1, wherein the metadata includes a plurality of link certifications and a plurality of public cryptographic keys associated with a plurality of nodes including the first node, each link certification being associated with a respective node and a prior node from the respective node in a logical node chain that the packet has traversed; and
the processing circuitry is further configured to verify a validity of at least one of the plurality of link certifications using at least one of the plurality of public cryptographic keys to detect at least one of tampering of the packet along the logical node chain and incorrect packet steering.

14. The intermediate node of claim 1, wherein the first node is positioned immediately prior to the intermediate node in a logical node chain.

15. A method implemented in an intermediate node in communication with a first node and a second node, the method comprising:
receiving a packet, the packet including metadata associated with first input data of the first node, first output data of the first node, a first process certification (PC) signature and a public cryptographic key associated with the first node;
verifying that the first PC signature corresponds to a process that led from the first input data of the first node to the first output data of the first node using the public cryptographic key;
verifying a link between first node and the intermediate node by comparing the received packet and the first output data of the first node;
determining whether to perform at least one service function on the packet based at least in part on the verification of the first PC signature and the verification of the link between the first node and the intermediate node;
verify that a second PC signature corresponds to a process that led from input data of the second node to output data of the second node using the public cryptographic key;
verify a link between the second node and the first node by comparing the second output data of the second node and the first output data of the first node; and
the determination whether to perform at least one service function on the packet being based at least in part on the verification of the second PC signature and the verification of the link between the second node and the first node.

16. The method of claim 15, further comprising verifying the packet has traveled from the second node to the first node and then to the intermediate node by:
verifying a first link certificate associated with the first node and the intermediate node in a logical node chain that the packet has traversed; and
verifying a second link certificate associated with the first node and the second node in the logical node chain that the packet has traversed.

17. The method of claim 15, further comprising:
performing a hash on the packet to generate a local input hash of the packet;
comparing the local input hash to the first output data of the first node; and
the determining whether to perform at least one service function on the packet being based at least in part on the comparing of the local input hash and the first output data of the first node.

18. The method of claim 17, further comprising:
after performing the at least one service function on the packet, performing a hash on the packet to generate a local output hash; and
generating a local process certification at least in part by signing the local input hash and local output hash of the packet using a private cryptographic key associated with the intermediate node, the local process certification indicating the intermediate node performed at least one service function on the packet.

19. The method of claim 18, further comprising generating a local link certification at least in part by signing the first input data, first output data, the local input hash and local output hash using the private cryptographic key associated with the intermediate node, the local link certification indicating the intermediate node performed at least one service function on the packet after the first node performed at least one other service function on the packet.

20. The method of claim 19, further comprising modifying the metadata to include the local process certification, the local link certification and a public cryptographic key associated with the intermediate node.

21. The method of claim 20, further comprising causing transmission of the modified metadata and the packet to a subsequent node.

22. The method of claim 15, wherein the metadata includes a respective output hash and respective input hash for a plurality of nodes in a logical node chain that the packet has traversed, the first input data corresponding to a first input hash and the first output data corresponding to a first output hash, the plurality of nodes including the first node; and
the method further comprising verifying a validity of the metadata associated with the plurality of nodes to detect at least one of tampering of the packet along the logical node chain and incorrect packet steering.

23. The method of claim 22, wherein the verification is performed for each of the plurality of nodes (16) in the logical node chain that the packet traversed.

24. The method of claim 22, wherein the verification is performed for at least one of the plurality of nodes that provides at least predefined service function on the packet, the verification not being performed for the remaining plurality of nodes that do not provide the at least one predefined service function on the packet.

25. The method of claim 22, wherein the verification fails for at least one of the plurality of nodes; and the method further comprising, in response to the failed verification, one of:
dropping the packet;
triggering an alert; and
performing at least one service function on the packet.

26. The method of claim 15, wherein the metadata includes a plurality of process certifications and a plurality of public cryptographic keys associated with the plurality of nodes including the first node, each process certification being associated with a respective node in a logical node chain that the packet has traversed; and the method further comprising verifying a validity of at least one of the plurality of process certification using at least one of the plurality of public cryptographic keys to detect at least one of tampering of the packet along the logical node chain and incorrect packet steering.

27. The method of claim 15, wherein the metadata includes a plurality of link certifications and a plurality of public cryptographic keys associated with a plurality of nodes including the first node, each link certification being associated with a respective node and a prior node from the respective node in a logical node chain that the packet has traversed; and the method further comprising verifying a validity of at least one of the plurality of link certifications using at least one of the plurality of public cryptographic keys to detect at least one of tampering of the packet along the logical node chain and incorrect packet steering.

28. The method of claim 15, wherein the first node is positioned immediately prior to the intermediate node in a logical node chain.

\* \* \* \* \*